(12) United States Patent
Matye

(10) Patent No.: US 11,268,301 B2
(45) Date of Patent: Mar. 8, 2022

(54) AUTOMATIC HATCH FOR BULK MATERIAL CONTAINERS

(71) Applicant: Reinhard Matye, Charlevoix, MI (US)

(72) Inventor: Reinhard Matye, Charlevoix, MI (US)

( * ) Notice: Subject to any disclaimer, the term of this patent is extended or adjusted under 35 U.S.C. 154(b) by 623 days.

(21) Appl. No.: 15/963,560

(22) Filed: Apr. 26, 2018

(65) Prior Publication Data

US 2018/0313131 A1 Nov. 1, 2018

Related U.S. Application Data

(60) Provisional application No. 62/490,779, filed on Apr. 27, 2017.

(51) Int. Cl.
*E05B 51/02* (2006.01)
*E05B 83/14* (2014.01)
(Continued)

(52) U.S. Cl.
CPC .............. *E05B 51/02* (2013.01); *B60P 3/226* (2013.01); *B65D 90/10* (2013.01); *E05B 63/0052* (2013.01); *E05B 83/14* (2013.01); *B60J 7/1621* (2013.01); *E05B 65/001* (2013.01); *E05B 81/10* (2013.01); *E05B 81/18* (2013.01); *E05B 81/28* (2013.01); *E05C 3/008* (2013.01); *E05F 15/53* (2015.01); *E05F 15/614* (2015.01); *E05Y 2201/434* (2013.01); *E05Y 2201/456* (2013.01); *E05Y 2201/71* (2013.01); *E05Y 2400/32* (2013.01); *E05Y 2400/324* (2013.01);
(Continued)

(58) Field of Classification Search
CPC .......... E05B 51/02; E05B 83/14; B60P 3/226; B65D 90/10
See application file for complete search history.

(56) References Cited

U.S. PATENT DOCUMENTS 706,829 A 8/1902 Johnson
887,805 A 5/1908 Higgins
(Continued)

FOREIGN PATENT DOCUMENTS

DE 33658 11/1885
DE 2317289 12/1973
(Continued)

OTHER PUBLICATIONS

Jim Dumoulin, Space Shuttle Coordinate System, NSTS Suttle Reference Manual (1988), downloaded Feb. 4, 2010, pp. 1-27.

*Primary Examiner* — Gregory J Strimbu
(74) *Attorney, Agent, or Firm* — Gardner, Linn, Burkhart & Ondersma LLP

(57) ABSTRACT

An automatic hatch assembly for bulk material containers includes a hatch cover which covers a fill opening of the container, and may be retrofitted to existing containers equipped with a conventional hatch cover. A drive unit is operable to open and close the hatch cover, and a locking assembly actuates an extendable lock member. Optionally, a pneumatic seal is provided within the cover for sealing the container from the outside environment. The locking assembly is adapted to resist opening forces applied to the cover, such as when the container is pressurized, and a sequencing controller may be provided to facilitate automated operation of the opening/closing, locking/unlocking, and/or sealing/unsealing of the hatch cover.

17 Claims, 20 Drawing Sheets

(51) Int. Cl.
*B60P 3/22* (2006.01)
*B65D 90/10* (2006.01)
*E05B 63/00* (2006.01)
*E05F 15/614* (2015.01)
*E05C 3/00* (2006.01)
*E05B 81/10* (2014.01)
*E05B 65/00* (2006.01)
*E05B 81/18* (2014.01)
*E05B 81/28* (2014.01)
*E06B 7/20* (2006.01)
*E05F 15/53* (2015.01)
*B60J 7/16* (2006.01)

(52) U.S. Cl.
CPC ..... *E05Y 2400/336* (2013.01); *E05Y 2400/85* (2013.01); *E05Y 2800/12* (2013.01); *E05Y 2900/53* (2013.01); *E06B 7/20* (2013.01)

(56) References Cited

U.S. PATENT DOCUMENTS

| | | | |
|---|---|---|---|
| 1,197,560 A | 9/1916 | Smith |
| 2,464,670 A | 3/1949 | Carlson |
| 2,934,370 A | 4/1960 | Love et al. |
| 3,241,243 A | 3/1966 | Speer |
| 3,272,552 A | 9/1966 | Park |
| 3,307,267 A | 3/1967 | Barr et al. |
| 3,385,655 A | 5/1968 | Huston et al. |
| 3,387,738 A | 6/1968 | Kemp |
| 3,476,042 A | 11/1969 | Carney, Jr. et al. |
| 3,557,497 A | 1/1971 | Schafer et al. |
| 3,596,565 A | 8/1971 | Atkinson |
| 3,596,609 A | 8/1971 | Ortner et al. |
| 3,694,962 A | 10/1972 | McDonald et al. |
| 3,696,774 A | 10/1972 | Ostrem |
| 3,804,270 A | 4/1974 | Michaud et al. |
| 3,821,935 A | 7/1974 | Adler |
| 3,911,975 A | 10/1975 | van Soestbergen |
| 3,924,666 A | 12/1975 | Raison |
| 3,944,090 A | 3/1976 | Flood |
| 4,065,005 A | 12/1977 | Mahle et al. |
| 4,102,367 A | 7/1978 | Shulman et al. |
| 4,114,901 A | 9/1978 | Pot |
| 4,141,394 A | 2/1979 | Lassman et al. |
| 4,224,968 A | 9/1980 | Bosser et al. |
| 4,294,378 A | 10/1981 | Rabinovich |
| 4,334,633 A | 6/1982 | Piegza |
| 4,386,344 A | 5/1983 | Vecchiatto |
| 4,388,873 A | 6/1983 | Carleton et al. |
| 4,402,350 A | 9/1983 | Ehret et al. |
| 4,460,308 A | 7/1984 | Moon et al. |
| 4,570,816 A | 2/1986 | Ferris et al. |
| 4,665,653 A | 5/1987 | Franz et al. |
| 4,819,702 A | 4/1989 | Gerlach |
| 4,854,076 A | 8/1989 | Sieben et al. |
| 4,891,910 A | 1/1990 | Cook et al. |
| 4,944,233 A | 7/1990 | Dugge et al. |
| 4,948,185 A | 8/1990 | Miller |
| 4,980,570 A | 12/1990 | Yasunaga et al. |
| 5,001,866 A | 3/1991 | Powell et al. |
| 5,029,595 A | 7/1991 | Hautau |
| 5,105,714 A | 4/1992 | Sprafke et al. |
| 5,280,973 A | 1/1994 | Culling |
| 5,283,979 A | 2/1994 | Carlson et al. |
| 5,284,097 A | 2/1994 | Peppin et al. |
| 5,303,034 A | 4/1994 | Carmichael et al. |
| 5,319,442 A | 6/1994 | Rosser |
| 5,323,327 A | 6/1994 | Carmichael et al. |
| 5,359,942 A | 11/1994 | Ward |
| 5,372,229 A | 12/1994 | Leibling |
| 5,415,512 A | 5/1995 | Buchfink |
| 5,700,043 A | 12/1997 | Rohard et al. |
| 5,781,399 A | 7/1998 | Lanigan et al. |
| 5,881,780 A | 3/1999 | Matye et al. |
| 5,937,581 A | 8/1999 | Mayte et al. |
| 6,047,885 A | 4/2000 | Fisher |
| 6,053,348 A | 4/2000 | Morch |
| 6,105,805 A | 8/2000 | Labelle et al. |
| 6,196,590 B1 | 3/2001 | Kim |
| 6,269,928 B1 | 8/2001 | Kamm |
| 6,293,051 B1 | 9/2001 | Matye |
| 6,318,402 B1 | 11/2001 | Ladeira |
| 6,352,036 B1 | 3/2002 | Early |
| 6,422,457 B1 | 7/2002 | Frich et al. |
| 6,427,384 B1 | 8/2002 | David, Jr. |
| 6,561,373 B1 | 5/2003 | Chapin |
| 6,623,209 B1 | 9/2003 | Waters, Jr. |
| 7,055,440 B2 * | 6/2006 | Sisk ...................... B65D 90/10 |
| | | | 105/286 |
| 7,077,618 B2 | 7/2006 | Knoch |
| 7,427,089 B2 | 9/2008 | Silverio et al. |
| 2004/0262314 A1 | 12/2004 | Weatherhead |
| 2007/0179005 A1 * | 8/2007 | Watanabe ................ F16J 13/18 |
| | | | 475/150 |

FOREIGN PATENT DOCUMENTS

| | | |
|---|---|---|
| DE | 2334648 | 1/1975 |
| EP | 0191738 | 8/1986 |
| GB | 267973 | 12/1927 |
| GB | 781140 | 8/1957 |
| GB | 1210749 | 10/1970 |
| JP | 2002120894 A | 4/2002 |
| SU | 387875 | 10/1973 |

* cited by examiner

AUTOMATIC HATCH FOR BULK MATERIAL CONTAINERS

CROSS REFERENCE TO RELATED APPLICATION

The present application claims the benefit of U.S. provisional application Ser. No. 62/490,779, filed Apr. 27, 2017, which is hereby incorporated herein by reference in its entirety.

FIELD OF THE INVENTION

The present invention relates generally to an opening and closing device, and more particularly, to a hatch opening and closing device for a container, especially a bulk material container on a vehicle such as a trailer truck or rail car.

BACKGROUND OF THE INVENTION

Vehicles for hauling bulk materials, such as ash, cement, lime, plastic resin, fertilizers, chemicals, grains, liquid fuels, and the like, typically include one or more storage containers. Similar storage containers may also be used in fixed locations. Each storage container will generally include at least one fill opening at the top, fitted with a removable or openable hatch cover for selectively covering the opening in the container.

SUMMARY OF THE INVENTION

The automatic hatch of the present invention is adapted for selectively opening and closing an opening of a container, such as a fixed container or a portable container associated with a vehicle. For example, a portable container may be associated with a truck trailer, a rail car, a ship, or the like. The automatic hatch is remotely operable to unlock, open, close, and lock (and optionally, to seal and unseal) the container opening on which the automatic hatch is used. The automatic hatch of the present invention may be particularly well-suited for container openings at elevated locations, so that an operator need not climb the container or vehicle in order to operate the hatch. The automatic hatch may also be well-suited for closing and sealing pressurizable containers in which the gas or fluid pressure inside the container is greater than atmospheric pressure, so that a significant opening force is applied to the hatch by fluid pressure when the hatch is closed and the tank or container is pressurized. The automatic hatch may be configured as a retrofit for a container from which a conventional hatch has been removed, and may include a locking device with at least one extendable or otherwise deployable lock member that is reinforced, in its extended or locking position, by one or more support members to resist any opening forces that are applied to the hatch cover.

According to one form of the present invention, an openable and closeable hatch is provided for a container of a vehicle, the hatch including a base defining an opening that corresponds to an opening in the vehicle, and a cover pivotably coupled to the base and positionable between an open configuration and a closed configuration. A locking device is coupled to the base or the cover and it has an extendable lock member adapted to selectively move between an extended position and a retracted position. The cover includes at least one projection that extends outwardly from the cover for engagement by the extendable lock member. The extendable lock member of the locking device is movable to an extended configuration or position, such that the extendable member interacts with the at least one projection to cause said cover to be locked in said closed configuration In one aspect, the at least one projection is made up of a pair of projections that pivotably support a hook member, such that moving the extendable member to the extended position causes the hook member to pivot into a position that engages a portion of the base.

In another aspect, the locking device includes a double-acting cylinder, and the extendable lock member is a pin, the pin being axially extendable and retractable by the double-acting cylinder. Optionally, the double-acting cylinder is a pneumatic cylinder which extends and retracts the pin when compressed air is directed into the cylinder.

In yet another aspect, an outer portion of the base forms an annular lip, which defines an upper portion of the base opening. The cover defines an annular channel in a lower surface thereof, the annular channel receiving the annular lip of the base when the cover is closed. Optionally, an annular seal is disposed inside of the annular channel, and engages the annular lip of the base in a direction that is generally perpendicular to the longitudinal axis of the annular lip. The annular lip has an outer surface that is engaged by the annular seal, which is directed radially outwardly against the inner surface of the annular lip. Optionally, the seal is a pneumatic inflatable seal.

In still another aspect, the hatch includes a pivot rod coupled to the cover and the base. The pivot rod has a longitudinal axis and is pivotable about this longitudinal axis to pivot the cover relative to the base. A motor is coupled to the pivot rod and is operable to pivot the pivot rod and the cover about the longitudinal axis of the pivot rod.

In a still further aspect, the hatch includes a circumferential flange projecting radially outwardly from around the base, the flange having a plurality of circumferentially-spaced bores extending generally parallel to a longitudinal axis of the base opening. The base is removably coupled to the vehicle at the vehicle opening by a plurality of removable fasteners that engage the circumferential flange of the base at the circumferentially-spaced bores, and that engage the vehicle at corresponding mounting elements disposed around the vehicle opening.

Thus, the present invention provides an automatic hatch that is openable, closeable, lockable, and sealable from a remote location, and which may be particularly well-suited for closing and sealing openings in pressurized containers. The hatch may also be removably coupled to a vehicle that had been equipped with a conventional hatch, such as for retrofit purposes.

These and other objects, advantages, purposes, and features of the present invention will become apparent upon review of the following specification in conjunction with the drawings.

DESCRIPTION OF THE PREFERRED EMBODIMENTS

The present invention is directed to an automatic hatch for vehicles equipped with bulk material containers, or for bulk material containers in fixed locations such as indoor or outdoor storage or material handling locations. For example, the present invention may be particularly well-suited for securely covering and/or sealing an opening in a bulk material container associated with a vehicle such as a truck trailer, a rail car, a shipping container, or the like, and may be particularly useful when the container opening is located at an elevated or remote location. In addition, the automatic hatch includes a locking mechanism capable of securing the hatch in a closed position, and adapted to resist opening forces acting upon the hatch, such as due to fluid pressurization of the container. While the present invention is described primarily with reference to a container associated with a truck trailer, it should be understood that the same or similar principles may be used for other fixed or transportable containers or surfaces having openings that are opened and closed throughout the course of use.

Figure 1:
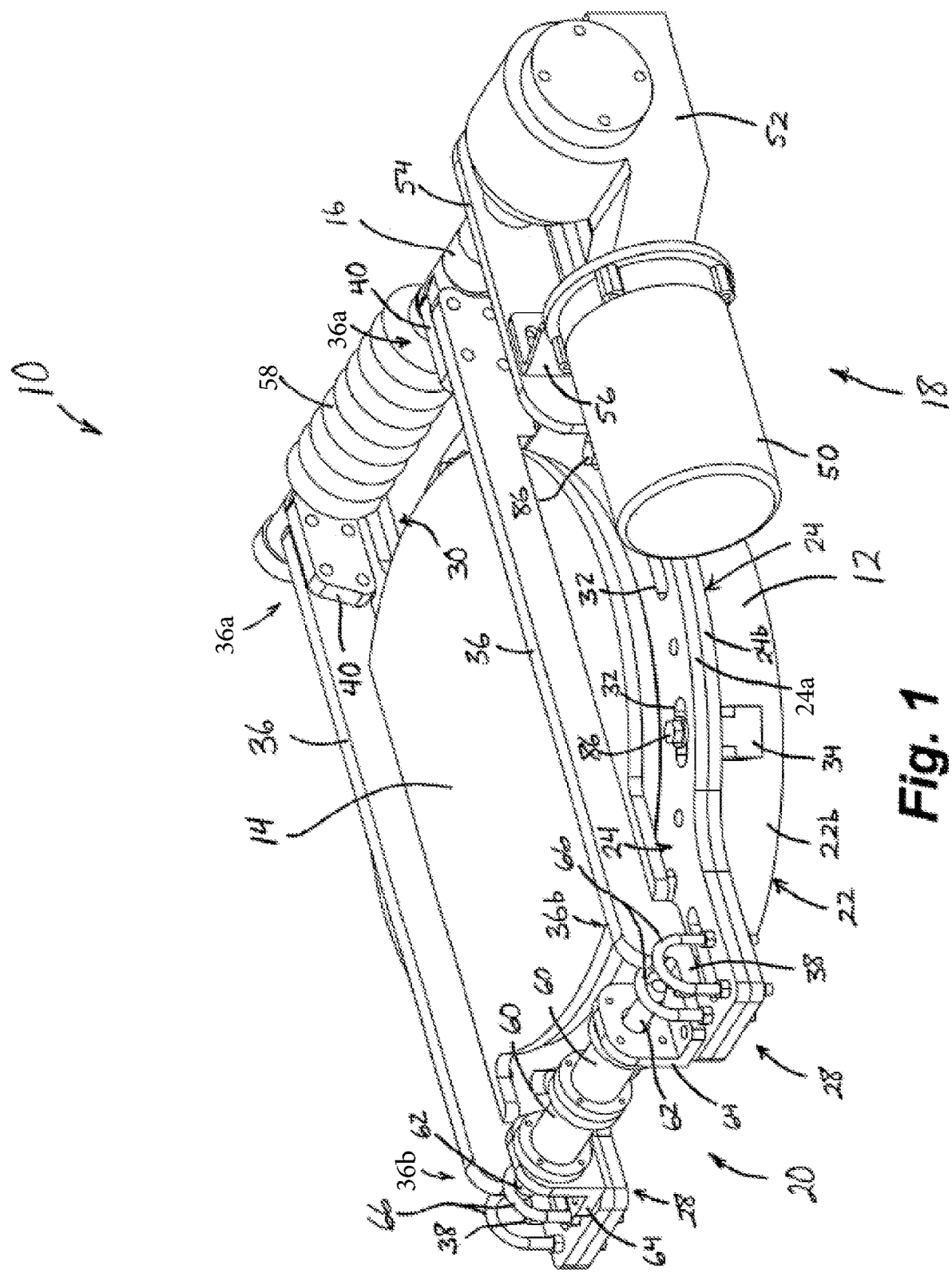
FIG. 1 is a top perspective view of an automatic hatch in accordance with the present invention.

Referring now to FIG. 1, an automatic hatch assembly 10 includes a base 12 and a cover 14 pivotably coupled to the base 12 via a hinge or pivot rod unit 16. A drive assembly 18 is coupled to base 12 and is operative to pivot or rotate an inner shaft 16a (FIG. 5) of rod unit 16 about its longitudinal axis to thereby open and close cover 14. A locking assembly or device 20 is coupled to base 12 opposite pivot rod unit 16, and is operable to selectively lock and unlock cover 14 in the closed position (FIGS. 1-4). When locking assembly 20 is in an unlocking configuration (FIGS. 1, 6 and 7), drive unit 18 may be activated to open cover 14, as in FIGS. 6-8.

Figure 5:
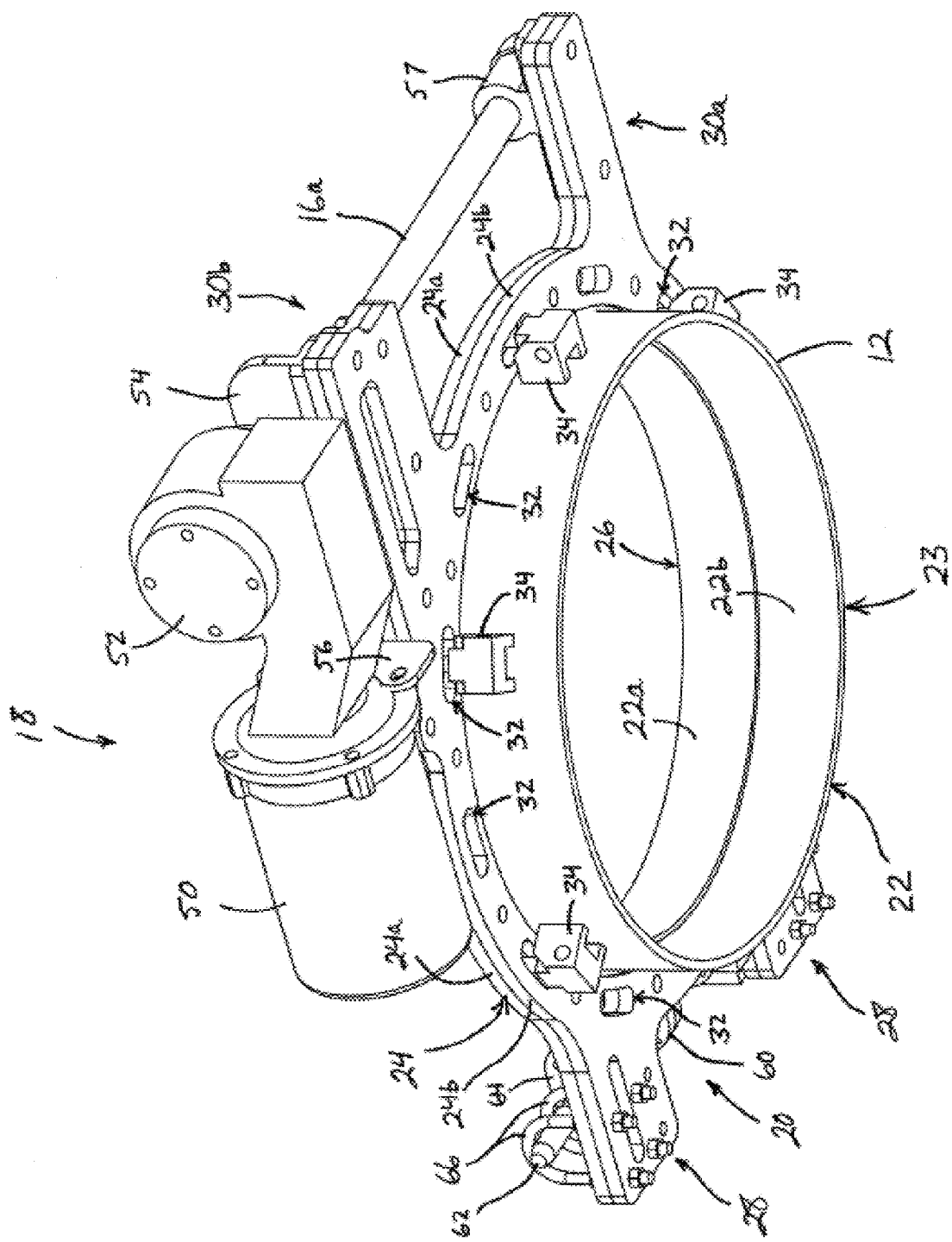
FIG. 5 is a bottom perspective view of the automatic hatch of FIG. 1, with the cover removed.
Figure 6:
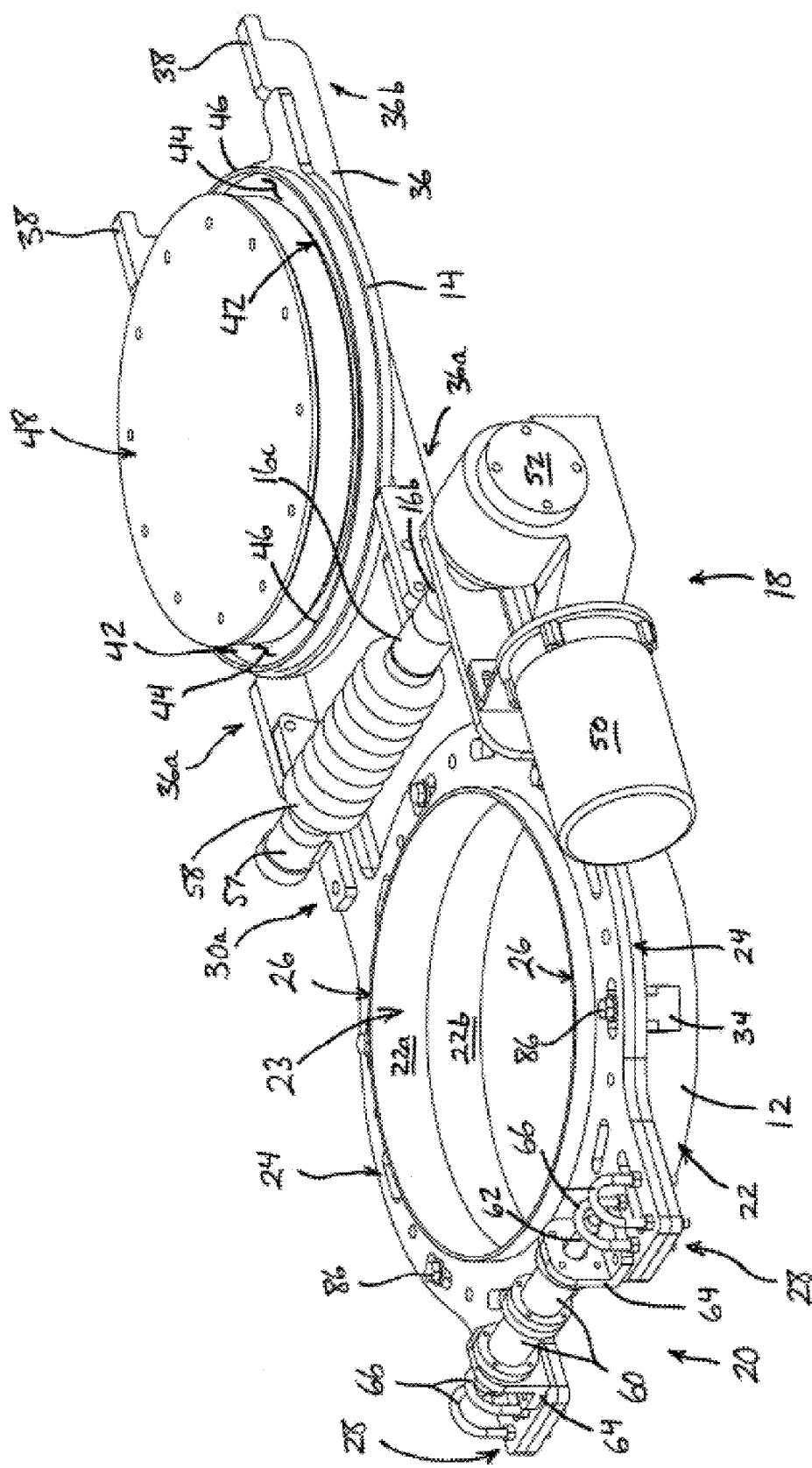
FIG. 6 is a top elevation of the automatic hatch of FIG. 1, with the cover positioned in an open configuration.
Figure 7:
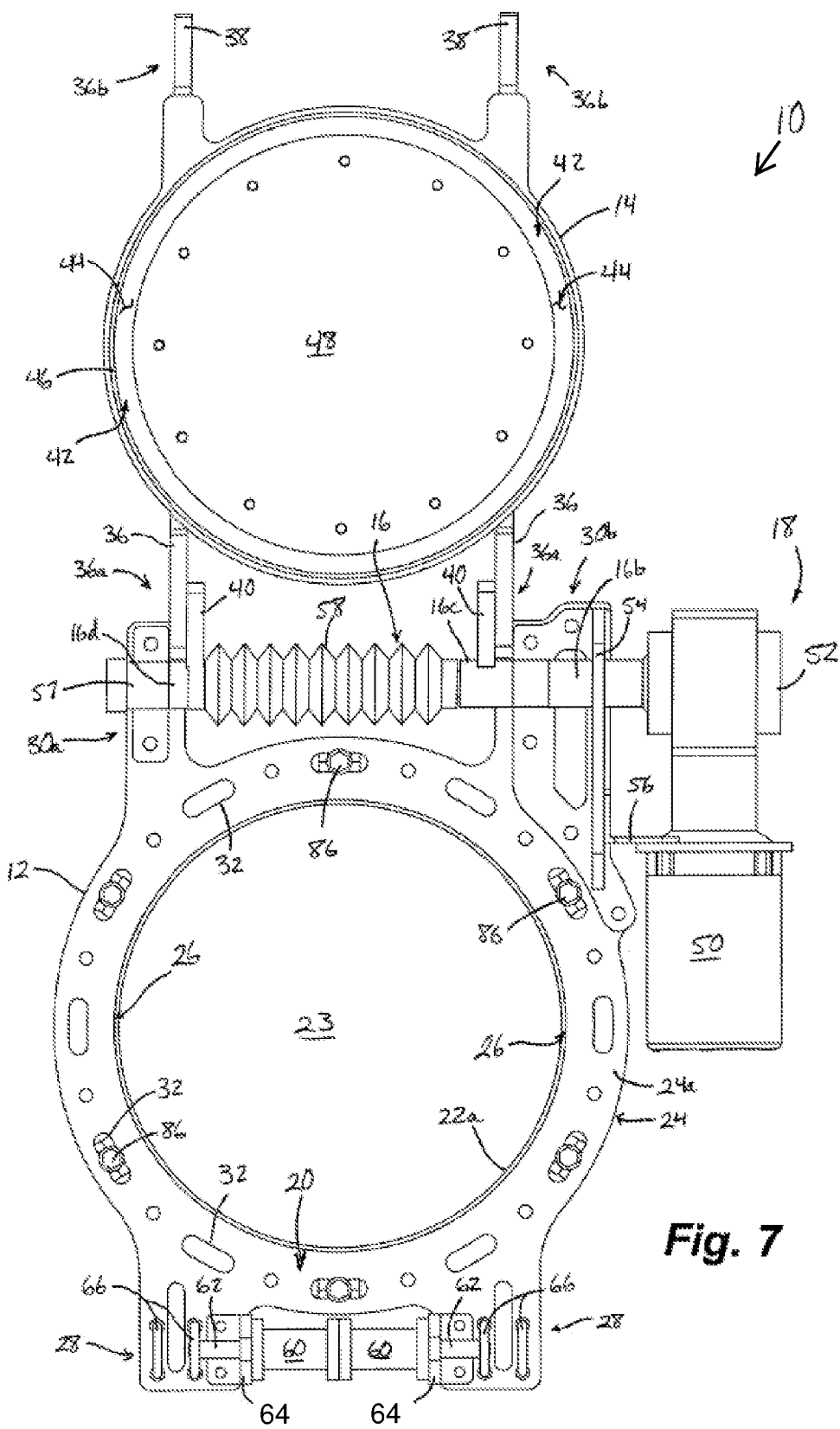
FIG. 7 is a top plan view of the automatic hatch of FIG. 6.

Base 12 includes an annular or hoop-shaped portion 22 defining a base opening 23 (FIGS. 5-7), and an annular flange portion 24 extending radially outwardly from and circumferentially around the outside surface or periphery of annular portion 22. In the illustrated embodiment, annular portion 22 is a single unitary piece made up of an upper annular portion 22a and a lower annular portion 22b, while the illustrated flange portion 24 includes two separate pieces, namely, an upper flange portion 24a (corresponding to upper annular portion 22a) and a lower flange portion 24b (corresponding to lower annular portion 22b), as best shown in FIG. 5. It is understood that in additional embodiments the upper and lower annular portions 22a, 22b may be separate pieces welded together, and similarly, the upper and lower annular flange portions 24a, 24b may be a single unitary piece. The annular portion 22 is joined to the upper flange portion 24a by welding and the upper and lower flange portions 24a, 24b are attached by fasteners, such as bolts. Again, it is conceivable that such joining and attaching in additional embodiments may done by welding and/or with mechanical fasteners or the like. As best shown in FIGS. 5-7, upper annular portion 22a includes an annular lip 26 at the uppermost portion of upper annular portion 22a of base 12. As further shown in FIG. 5, there is a gap between the lower flange portion 24b and the annular portion 22, where a silicone seal may be secured or otherwise disposed for interfacing with the existing truck hatch when attaching the base 12 thereto.

Flange 24 includes a pair of spaced front projections 28 for supporting locking assembly 20, and further includes a pair of rear flange projections 30a, 30b for supporting drive unit 18 and pivot rod unit 16. Flange 24 further includes a plurality of circumferentially spaced, oblong openings or bores 32 to facilitate attachment of hatch assembly 10 to a vehicle, such as will be described below. A plurality of mounting blocks 34 may be positioned in a circumferentially spaced arrangement around the outside periphery of annular portion 22 of base 12 (such as along lower annular portion 22b), with each of the mounting blocks 34 disposed beneath a respective bore 32 in flange 24 (FIG. 5) for attaching to the truck hatch collar lugs. Accordingly, the mounting blocks 34 are also used for attaching or clasping the hatch assembly 10 to a hatch collar of a vehicle, such as by coupling to mounting elements associated with the hatch collar.

Figure 2:
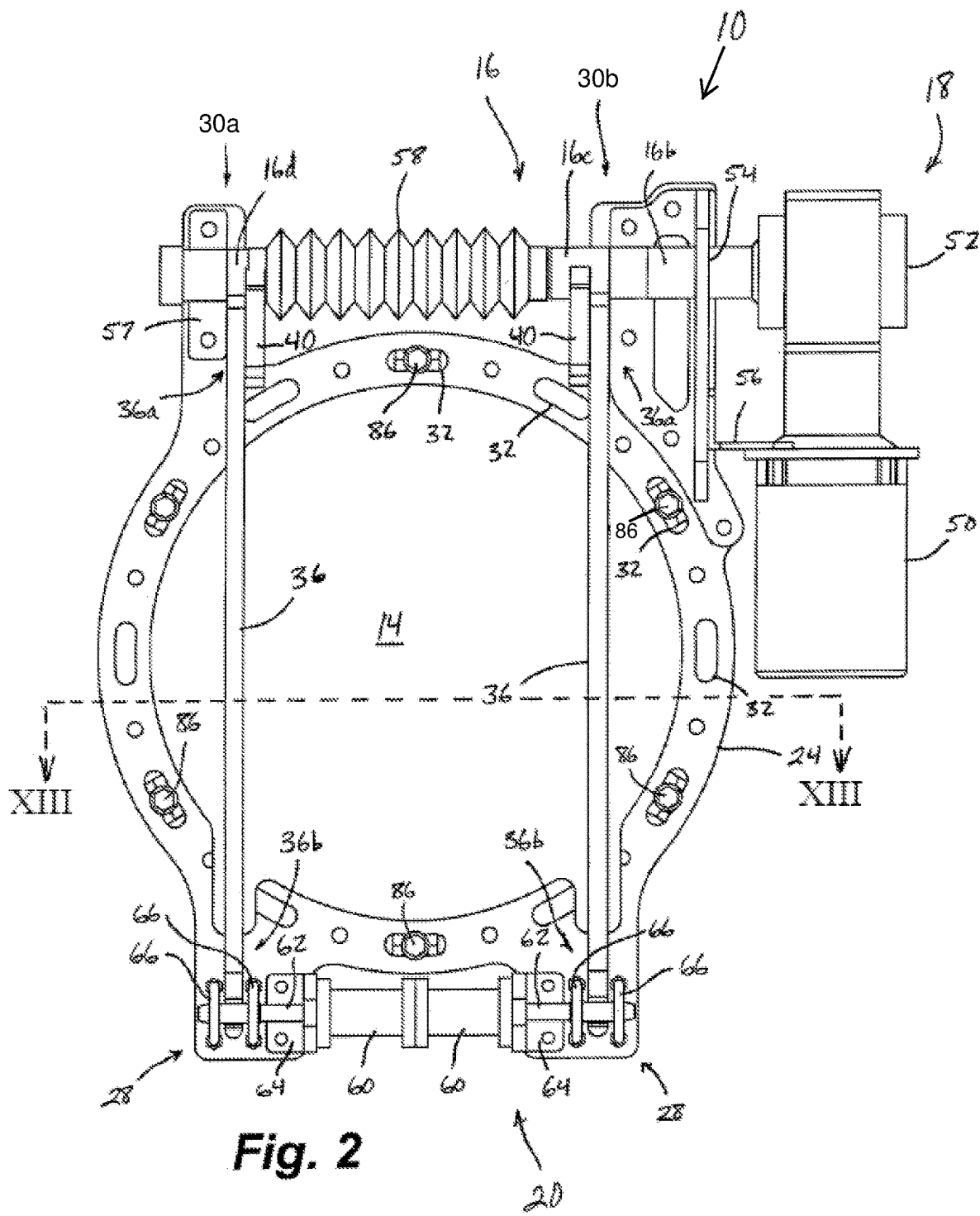
FIG. 2 is a top plan view of the automatic hatch of FIG. 1.
Figure 3:
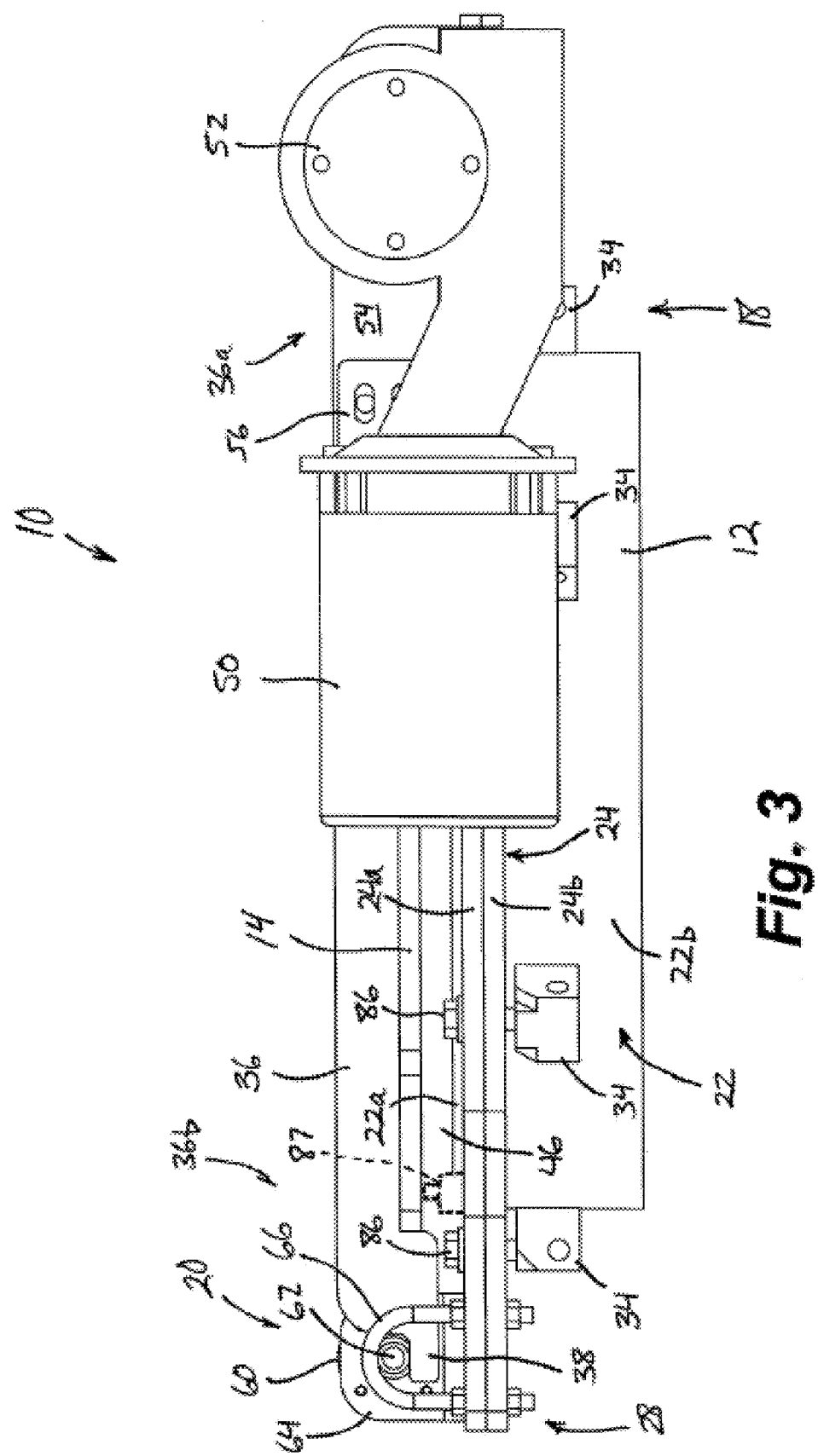
FIG. 3 is a left side elevation of the automatic hatch.
Figure 4:
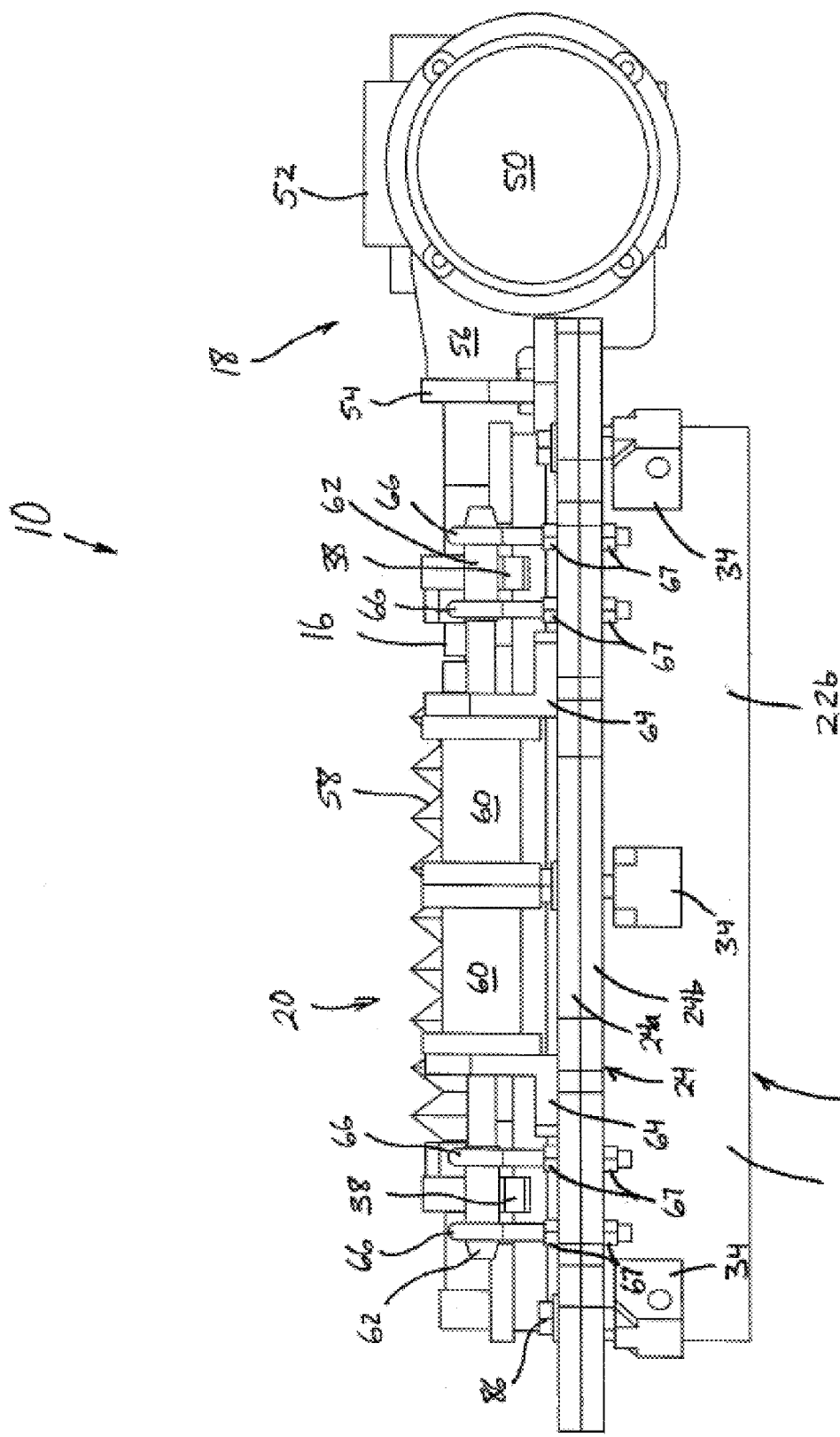
FIG. 4 is a front elevation of the automatic hatch.

Cover 14 is attached to a pair of spaced support arms 36 (such as by welding or with fasteners or the like), the support arms 36 each being fixedly coupled to pivot rod unit 16 at their proximal ends 36a (FIGS. 2 and 7). Distal end portions 36b of support arms 36 project forwardly from cover 14 and terminate at projections 38 that, in the illustrated embodiment, are offset at least slightly below the main portions of support arms 36 and an upper surface of cover 14 when cover 14 is closed (FIGS. 1, 3 and 4). Support arms 36 are coupled to pivot rod unit 16 via respective coupling blocks 40 (FIGS. 1, 2 and 7), which are rigidly coupled to both the support arms 36 and pivot rod unit 16 so that cover 14 pivots with pivot rod unit 16 about the axis of that rod when pivot rod unit 16 is driven by drive unit 18.

As best seen in FIGS. 6, 7 and 13A-B, cover 14 has an annular channel or groove 42 in a lower surface of the cover, the annular channel 42 being defined between a generally planar lower surface 44 of cover 14, an annular hoop-like projection 46 extending from planar lower surface 44 and arranged generally at the outer periphery of cover 14, and a cylindrical projection 48 that extends into the base opening 23 defined by annular portion 22 of base 12 when cover 14 is closed. Annular channel 42 is adapted to receive annular lip 26 of upper annular portion 22a of base 12 when cover 14 is closed. Optionally, an annular pneumatic seal 49 (FIGS. 13A-B) may be disposed inside annular channel 42, such as near the intersection of planar lower surface 44 and cylindrical projection 48. The annular pneumatic seal 49 is an inflatable seal that engages annular lip 26 and provides a sealing force acting radially outwardly upon inflation to provide a fluid-tight junction between cover 14 and base 12. Another such annular inflatable seal that is suitable for use with the hatch disclosed herein is described in commonly-assigned U.S. Pat. No. 5,937,581, which is hereby incorporated herein by reference in its entirety. Further, a silicon seal may also or alternatively be disposed inside the annular channel 42, such as at the planar lower surface 44 of the cover 14, so as to directly or indirectly engage the annular lip 26 or similar portion of the base 12.

Drive unit 18 includes a drive motor 50 coupled to a gear box 52, each of which is supported at rear projection 30b of base 12 by a bracket 54. As shown in FIGS. 1, 2, 6 and 7, pivot rod unit 16 passes through a bore in bracket 54, and inner shaft 16a is rotatably or pivotably driven by gear box 52. In the illustrated embodiment, drive motor 50 is an electric motor coupled to bracket 54 via a motor bracket 56, while gear box 52 comprises a worm drive that amplifies the torque output of motor 50 and reorients the motor output approximately 90 degrees at inner shaft 16a of pivot rod unit 16, which is coupled to (or contiguous with) an output shaft of gear box 52. Optionally, drive motor 50 may be a hydraulically or pneumatically powered motor or the like, and may be configured to drive the pivot rod directly, or through a different gear arrangement than gear box 52, without departing from the spirit and scope of the present invention.

Pivot rod unit 16 includes a first outer shaft 16b that passes through bracket 54 and remains stationary relative to base 12, while inner shaft 16a is free to pivot inside of the outer shaft 16b (FIGS. 2 and 7). A second outer shaft 16c is located inboard of first outer shaft 16b (but still generally above rear flange portion 30b) and rotates or pivots with inner shaft 16a. A third outer shaft 16d is located near rear flange projection 30a and also pivots with inner shaft 16a. Coupling blocks 40 are attached to respective ones of the second and third outer shafts 16c, 16d of pivot rod unit 16, and thus are pivotably driven by inner shaft 16a via outer shafts 16c, 16d. A bracket 57 coupled to rear flange projection 30a receives an outboard end of inner shaft 16d (FIGS. 5-7), which projects through third outer shaft 16d, and may include a bushing or journal bearing or the like to rotatably support the end portion of inner shaft 16a. Optionally, a flexible dust jacket or boot 58 is disposed around the inner shaft 16a of pivot rod unit 16 to limit or prevent the intrusion of contaminants into the various components of pivot rod unit 16.

Optionally, a rotary switch or sensor may be provided at or near the end of the pivot rod unit 16, such as at the opposite end of the shaft 16a from the drive unit 18, to indicate or sense when the cover 14 is in the open or closed positions. Also or alternatively, such a rotary switch or sensor may be provided on or near the end of the shaft 16a coupling with the drive unit 18, such as at a coupler between the driver unit 18 and the arm or hub of the cover 14 or other conceivable location at or near the driver unit 18.

In the illustrated embodiment, locking assembly 20 includes a pair of double-acting cylinders 60, each capable of extending and retracting a respective extendable lock member in the form of a locking pin 62 (FIGS. 1, 2, 4, 6 and 7). Double acting cylinders 60 are joined to one another with their respective pins 62 extending outwardly in opposite directions from one another. Each cylinder 60 is coupled to a respective one of the front flange projections 28 by a respective right-angle support bracket 64 (FIGS. 1-4), which is attached via fasteners to the respective cylinder 60 and respective front flange projection 28.

Figure 9:
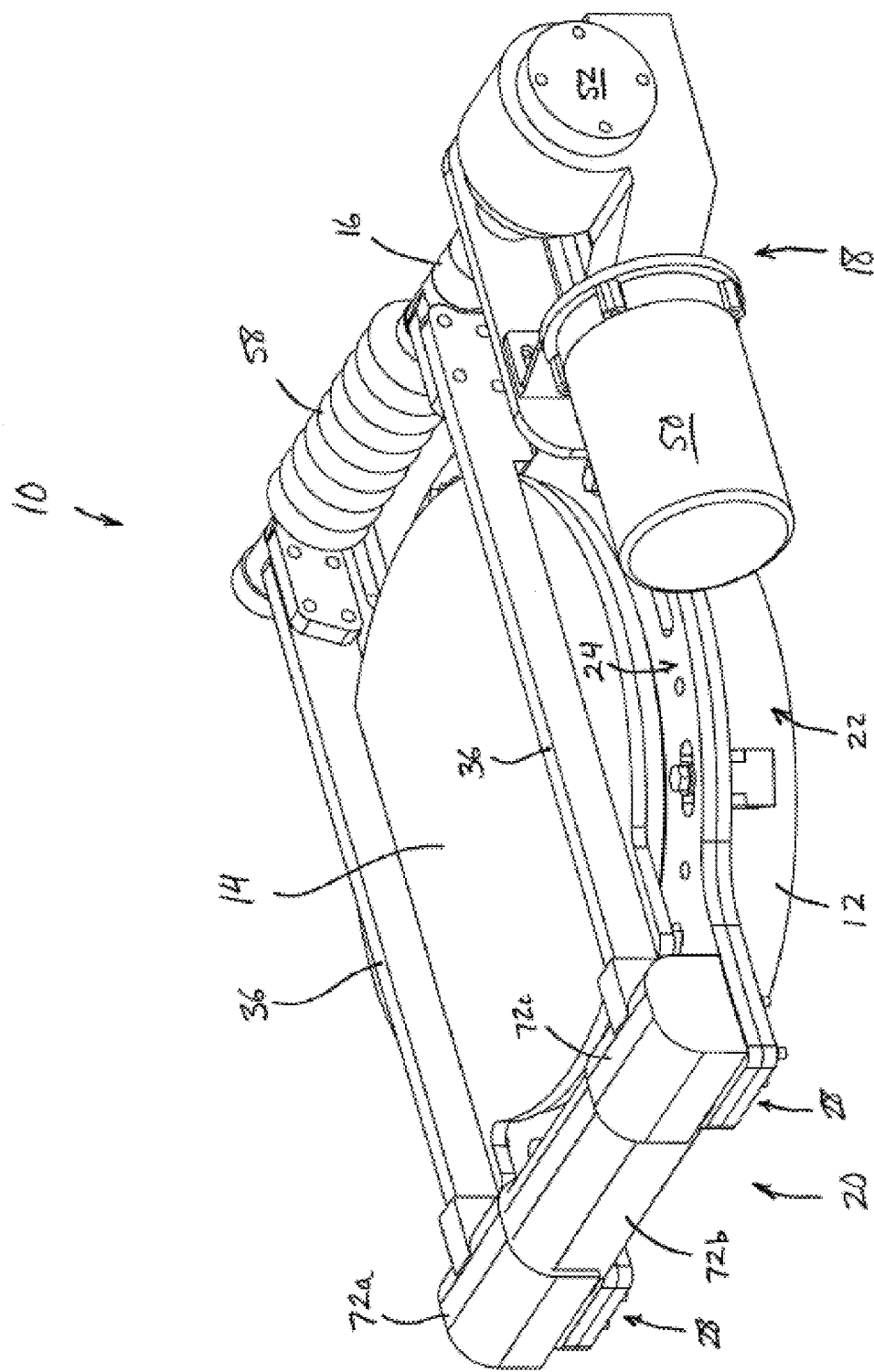
FIG. 9 is a top perspective view of the automatic hatch, including locking device covers.
Figure 10:
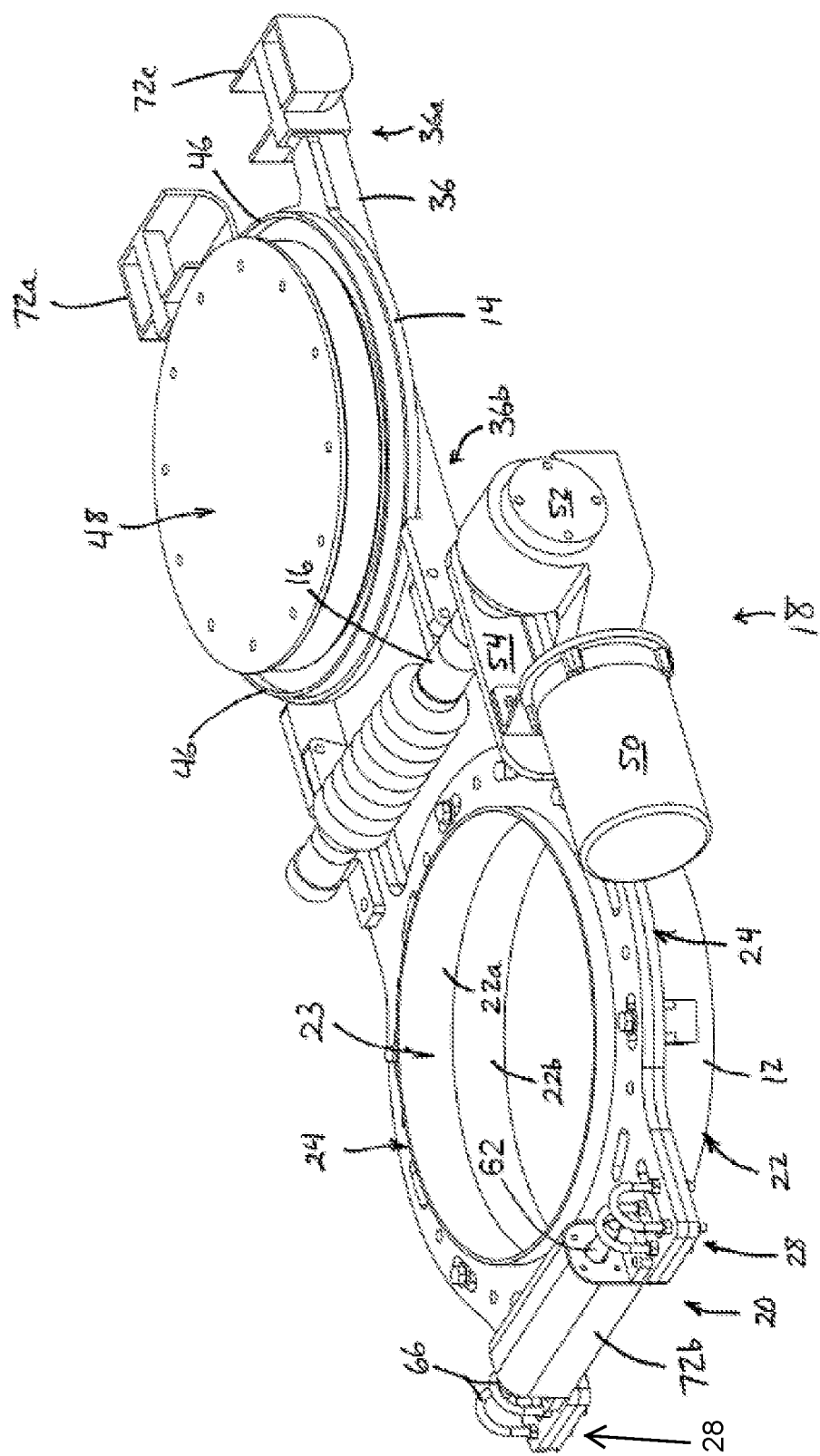
FIG. 10 is a top perspective view of the automatic hatch of FIG. 9, with the cover positioned in an open configuration.
Figure 11:
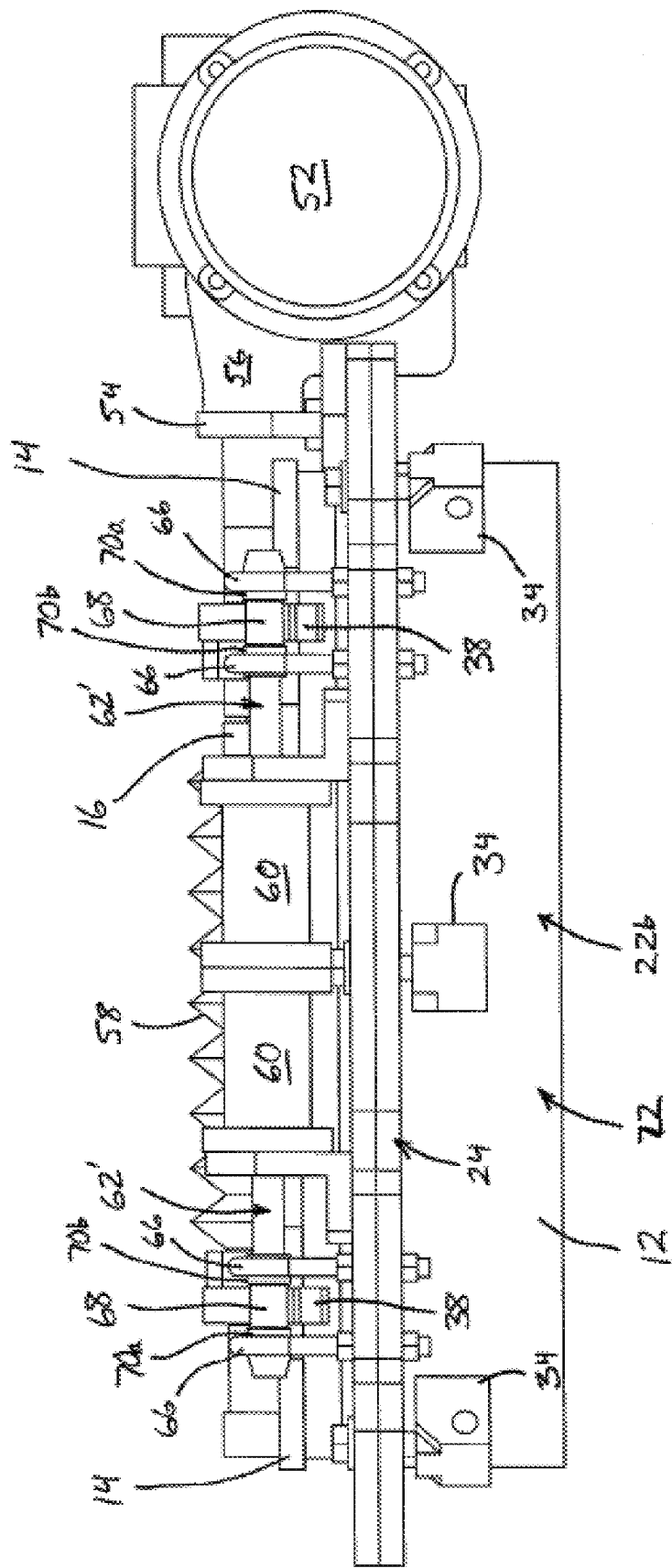
FIG. 11 is a front elevation of another automatic hatch in accordance with the present invention, having extendable lock pins with neck-down regions.

Also attached to each front flange projection 28 is a pair of inverted U-shaped members 66 that are spaced outward of the support bracket 64, and which are spaced to receive between them one of the projections 38 of a respective support arm 36 when cover 14 is closed (FIGS. 1, 2 and 4). Inverted U-shaped members 66 are arranged so that their upper portions provide clearance for locking pins 62 to extend beneath the upper portions of the inverted U-shaped members 66. In the illustrated embodiment of FIGS. 1-11, U-shaped members 66 are inverted U-bolts with their ends disposed in bores in the front flange projections 28 and fixed in place by pairs of threaded nuts 67. Optionally, the U-shaped members may be substantially any member with an aperture or opening for receiving pins 62 with an upper portion disposed above the respective pin 62, such as shown in FIG. 10.

Support arm projections 38 are arranged to provide clearance for locking pins 62 to extend over the projections 38 when locking pins 62 are extended. Thus, as best shown in FIGS. 2 and 3, when locking pins 62 are extended by their respective double acting cylinders 60, the pins 62 overlie or are disposed above projections 38, and the upper portions of inverted U-shaped members 66 are disposed above or overlie locking pins 62. Thus, when locking pins 62 are extended to their locking positions (FIGS. 2-5), pins 62 prevent cover 14 from being pivoted or raised toward an open configuration. Support arm projections 38 are precluded from such movement by pins 62, which in turn are supported by inverted U-shaped members 66. Thus, it will be appreciated that lateral loads (i.e., those applied perpendicularly to the longitudinal axes of locking pins 62) are primarily resisted by engagement of locking pins 62 with inverted U-shaped members 66 so that lateral loads are generally not transferred to double-acting cylinders 60.

Therefore, double-acting cylinders 60 may be sufficiently robust to actuate their corresponding locking pins 62 in various environmental conditions, but need not be reinforced or strengthened to resist the significant bending moments that would be incurred by the locking pins 62 if there were no such inverted U-shaped members 66 positioned to withstand the lateral loads. Accordingly, locking assembly 20 may be particularly well-suited to locking cover 14 in the closed configuration when a container that is closed by hatch assembly 10 is pressurized, because the loads applied to cover 14 by such pressurization can be resisted indefinitely by inverted U-shaped members 66 and locking pins 62 without any force required to maintain the locking pins in their extended or deployed positions. Although shown with a pair of inverted U-shaped members corresponding to each pin 62, it will be appreciated that, optionally, only one U-shaped member may be provided (on one or the other side of support arm projection 38) such that some lateral load is borne by cylinders 60 when an opening force is applied to cover 14. However, by using a pair of U-shaped members, lateral loads due to opening forces may be substantially or entirely borne by the U-shaped members with little or no lateral loads transferred to cylinders 60.

Double acting cylinders 60 may be pneumatic cylinders driving pistons (not shown) at the inner or inboard end portions of locking pins 62, and may be operable, for example, via the application of vacuum or pressurized air to opposite ends of the respective double-acting cylinders 60 to extend and retract the locking pins 62. Alternatively double acting cylinders 60 may be hydraulically actuated, or electrically or electromagnetically actuated, or the like.

Optionally, an alternative locking pin 62' (FIG. 11) includes a circumferential neck-down region 68 having a length that is substantially equal to or greater than the width of support arm projection 38. Locking pin 62' transitions from neck-down region 68 to larger-diameter sections 70a, 70b that are substantially similar in diameter to the overall diameter of locking pin 62, and which engage inverted U-shaped members 66 upon the application of an opening force to cover 14. When such a force is applied, support arm projections 38 engage locking pins 62' at neck-down region 68 so that locking pin 62 is prevented from inadvertent retraction due to interference of larger-diameter section 70a with projection 38. This provides an added safety benefit by reducing the likelihood that cover 14 could open inadvertently by accidental or forced retraction of locking pins 62' while an opening force is applied to cover 14.

Optionally, locking assembly covers 72a-c (FIGS. 9 and 10) may be installed at locking assembly 20 to protect the locking assembly from environmental elements and/or tampering. In the illustrated embodiment, covers 72a, 72c are attached to distal end portions 36b of support arms 36 and substantially cover front flange projections 28, inverted U-shaped members 66, and the portions of locking pins 62 extending from double-acting cylinders 60 when cover 14 is closed (FIG. 9). Cover 72b remains positioned over double-acting cylinders 60 whether cover 14 is open or closed (FIGS. 9 and 10). Thus, when cover 14 is closed, locking assembly covers 72a-c form a generally continuous cover over the upper portions of locking assembly 20.

Figure 12:
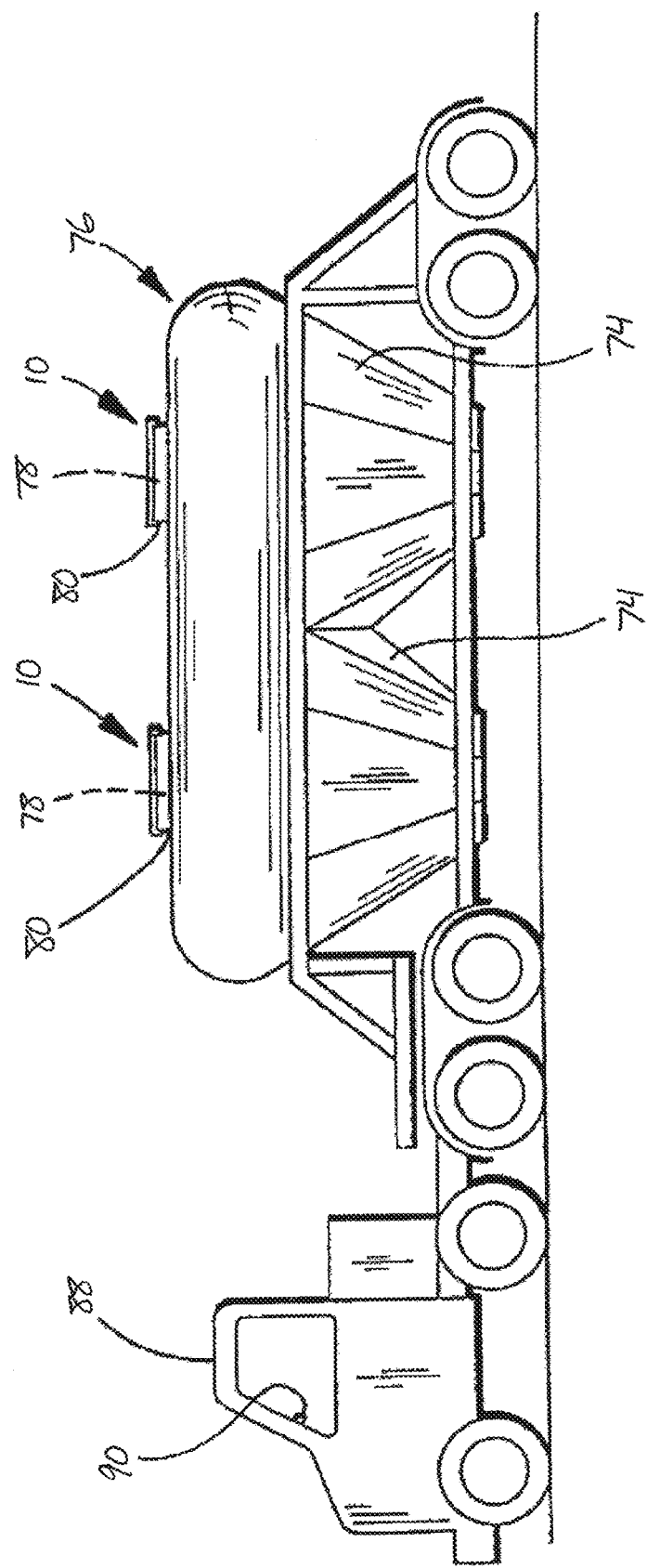
FIG. 12 is a side elevation of a vehicle of the type adapted to carry bulk materials and equipped with a pair of automatic hatches in accordance with the present invention.
Figure 13A:
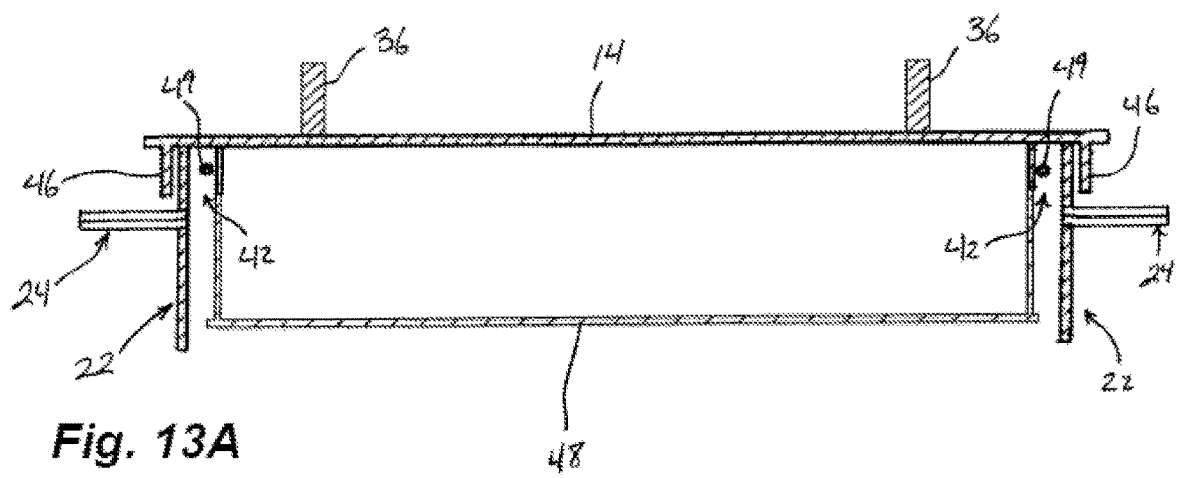
FIGS. 13A-B are sectional views of the cover and base of the automatic hatch, taken along line XIII-XIII of FIG. 2, with an annular seal shown in non-sealing and sealing configurations, respectively.
Figure 13B:
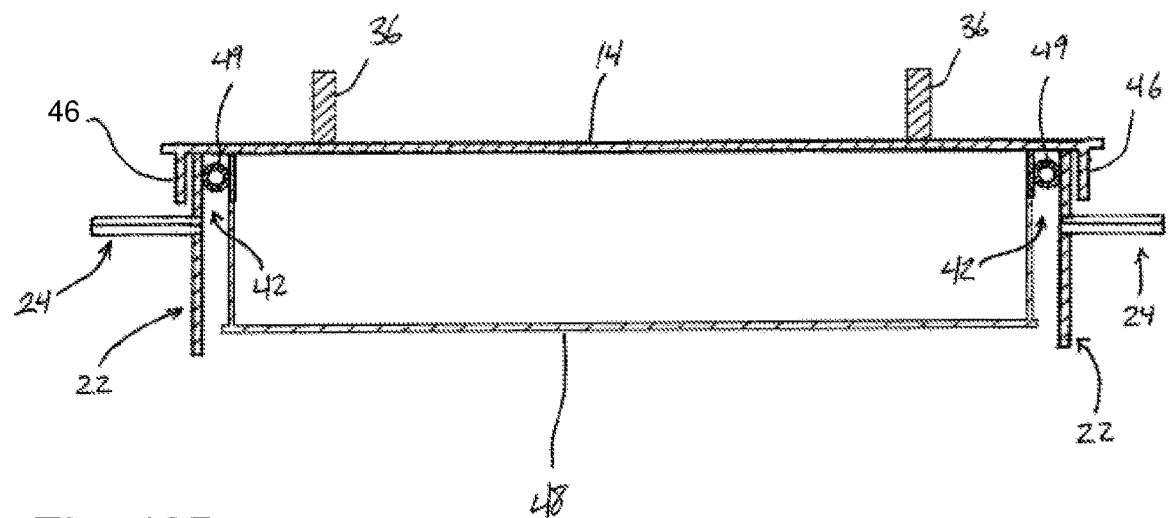

Referring now to FIG. 12, a pair of auto hatch assemblies 10 is shown positioned atop respective containers 74 of a vehicle 76. Each container 74 has a fill opening 78 along a top surface of the containers 74, the fill opening 78 being partially defined by an upstanding flange 80. Lower annular portion 22b of base 12 is sized and shaped to fit inside upstanding flange 80. Upstanding flange 80 may include a plurality of mounting elements (such as small projections or shoulder regions) disposed around the outer periphery of the flange 80 at circumferentially spaced positions and projecting radially outwardly therefrom. Each pair of mounting elements may receive a cross pin mounted between the individual mounting elements, the cross pin being selectively engaged by a threaded fastener 86 (FIGS. 1-3 and 6-8) projecting through spaced bores in a flange portion of the base 12, where each threaded fastener has a head portion that is greater in width than spaced bores 32.

Accordingly, hatch assembly 10 may be positioned in the opening 78 of a container 74, at upstanding flange 80, and oriented so that spaced bores 32 are generally aligned with mounting elements 82. Threaded fasteners 86 are installed through bores 32 to engage cross pins 84, whereby the hatch assembly 10 is held tightly to the upstanding flange 80 by tightening of the threaded fasteners 86. Thus, auto hatch assembly 10 may be installed as a retrofit to containers 74 of a vehicle 76, and used in place of a conventional hatch that had previously been attached to the upstanding flange 80 using mounting elements 82. Optionally, a switch 87 (shown in phantom in FIG. 3) is positioned along an upper surface of annular flange portion 24 near locking assembly 20, and is triggered by contact with a lower surface of cover 14 to provide an indication of when cover 14 is fully closed.

Vehicle 76 may include a cabin 88 in which a controller 90 is installed and operatively coupled to hatch assemblies 10 (FIG. 12) for operation of drive unit 18, locking assembly 20, and/or the pneumatic seal 49. By positioning controller 90 in cabin 88, an operator seated in the vehicle cabin 88 can readily control the operation of each automatic hatch assembly 10 from the relative safety and comfort of the cabin. Controller 90 may be in either wired or wireless (such as radio frequency) communication with hatch assemblies 10. Controller 90 may include separate controls for controlling the separate functions (i.e., locking/unlocking, opening/closing, sealing/unsealing) at desired times or in a desired sequence. Additionally, controller 90 may be an automatic sequencing controller whereby a single operator input initiates a sequence of operation of the hatch assembly 10, such as to unlock and open the hatch assembly, or to close and lock the hatch assembly.

For example, by depressing a single button at controller 90, an operator may initiate a sequence that first activates double-acting cylinders 60 to retract locking pins 62 before actuating drive assembly 18 to rotate pivot rod unit 16, which in turn opens cover 14 to expose the fill opening 78 of container 74. The same button could be used to initiate a sequence that, when the cover 14 is open, first ensures locking pins 62 are retracted by double-acting cylinders 60 before actuating drive assembly 18 to rotate pivot rod unit 16, which in turn closes cover 14 to cover the fill opening 78 of container 74. Optionally, a pneumatic seal may be depressurized prior to opening the cover 14, and may be repressurized after closing the cover. Controller 90 may provide visual feedback to the operator, such as in the form of status lights, and/or may generate audible tones indicative of the various operations and/or positions of drive units 18, locking assembly 20, cover 14, and the pneumatic seal 49.

Figure 8:
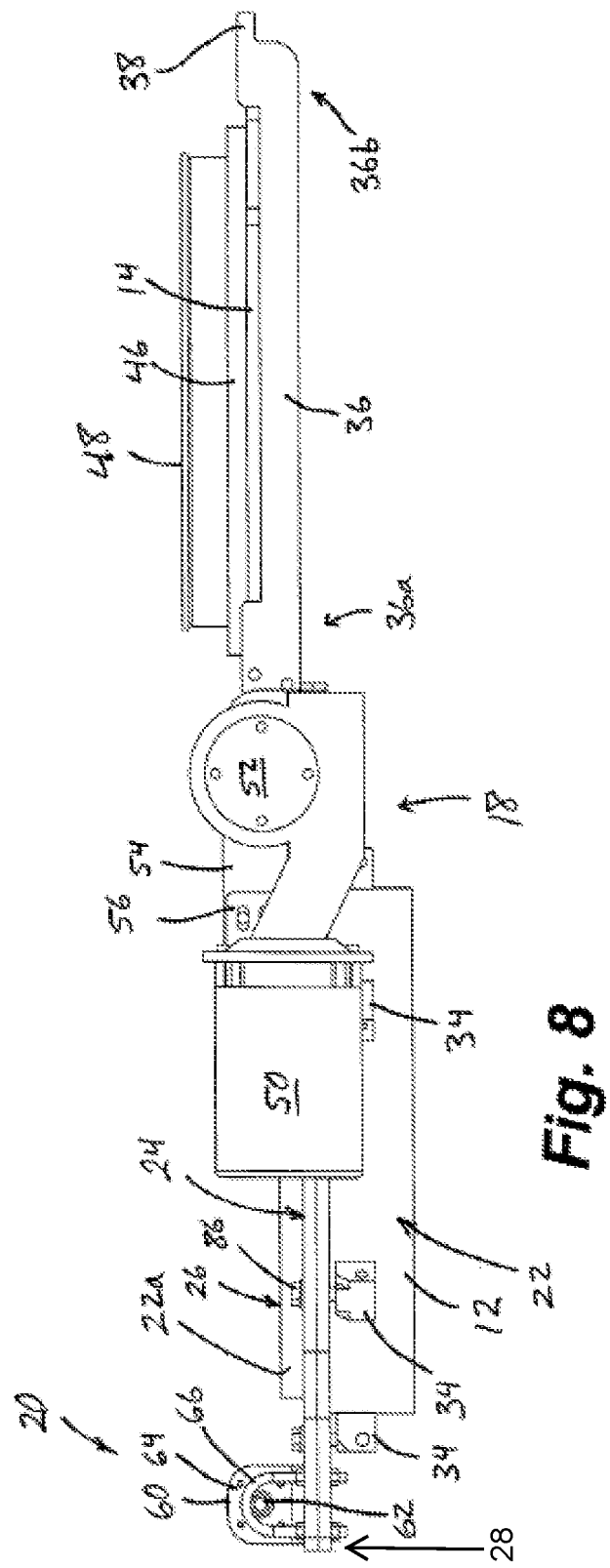
FIG. 8 is a left side elevation of the automatic hatch of FIG. 6.

Referring now to FIGS. 14-17A, another automatic hatch assembly 110 includes a base 112 and a cover 114 pivotably coupled to the base 112 via a hinge or pivot rod unit 116, where a locking assembly or device 120 is coupled to and supported by the cover 114. A drive assembly 118 is coupled to base 112 and is operative to pivot or rotate a shaft 116a (FIG. 14) of the rod unit 116 about its longitudinal axis to thereby open and close cover 114. The locking assembly or device 120 is coupled to cover 114 opposite pivot rod unit 116, and is operable to selectively lock and unlock cover 114 in the closed position (FIGS. 14-17). When the locking assembly 120 is in an unlocking configuration, the drive unit 118 may be activated to open the cover 114, similar to the position as shown in FIGS. 6-8.

Figure 14:
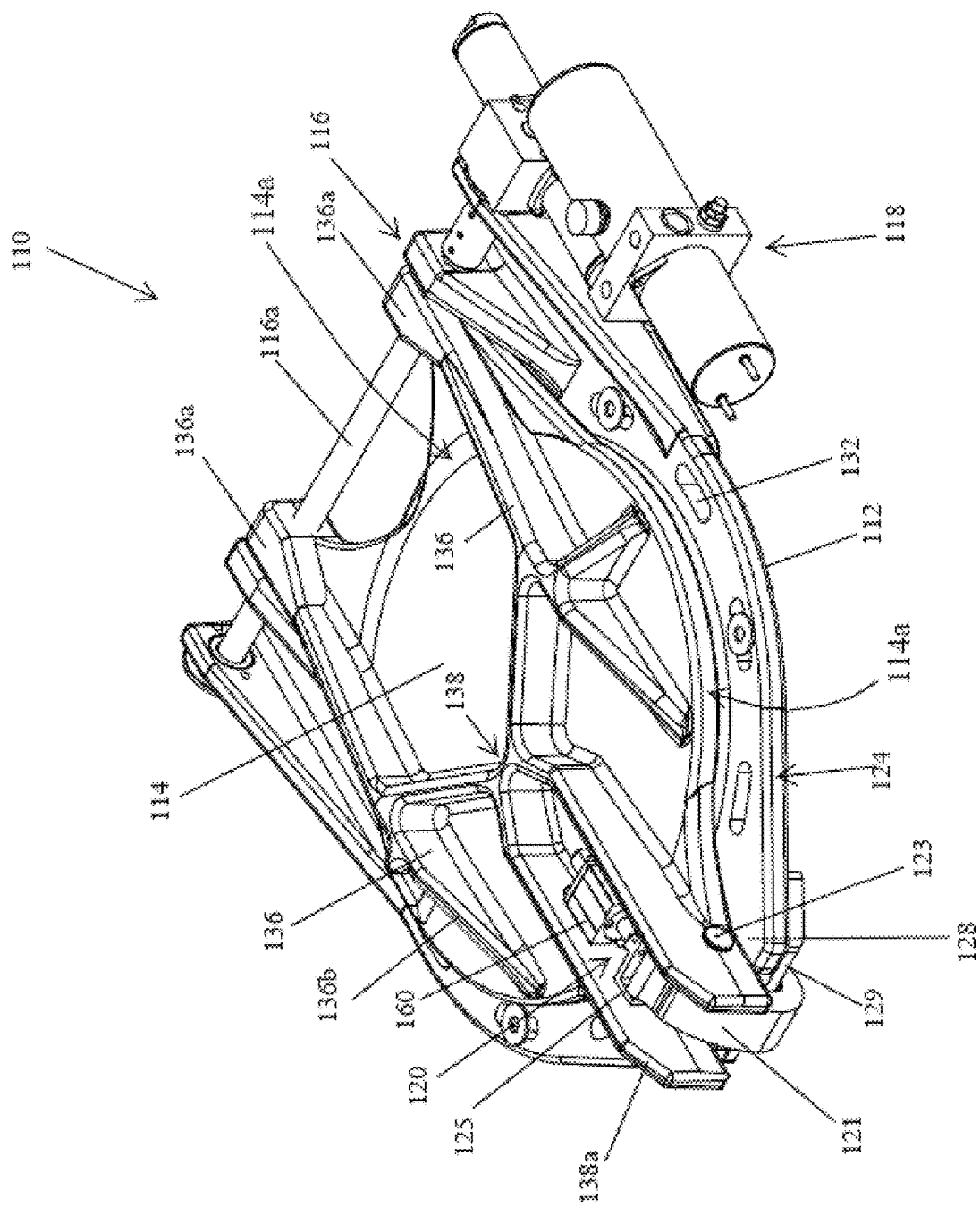
FIG. 14 is a perspective view of an additional embodiment of an automatic hatch in accordance with the present invention.
Figure 16:
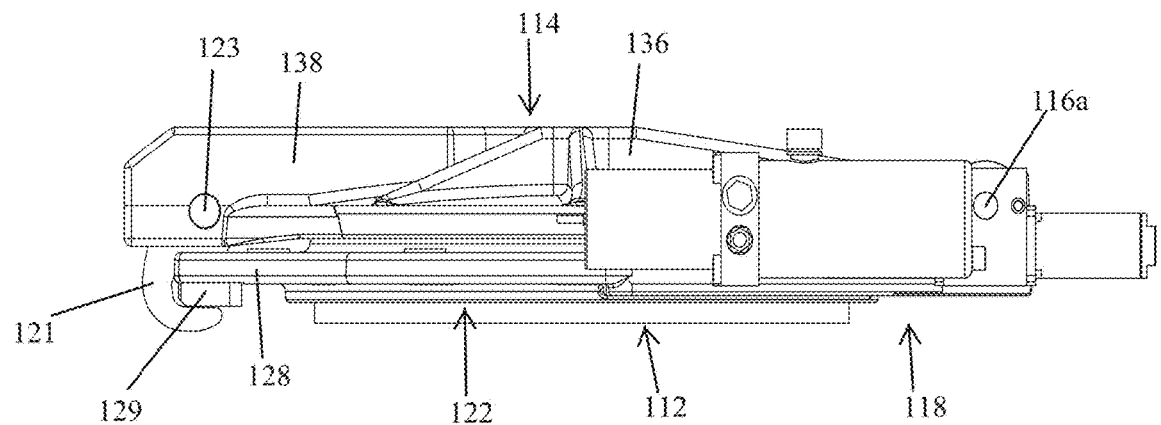
FIG. 16 is a side elevational view of the automatic hatch of FIG. 14.

Base 112 (FIG. 16) includes an annular or hoop-shaped portion 122 defining a base opening 122a (FIG. 17), and an annular flange portion 124 extending radially outwardly from and circumferentially around the outside surface or periphery of annular portion 122. The flange 124 includes a pair of front projections 128 that extend forward on opposing sides of a latch or hook member 121 of the locking assembly 120. As shown in FIGS. 14 and 16, a connection block 129 is attached, such as via welding, at a lower surface of each of the front projections 128 to span between the front projections 128 and thereby provide a structure for receiving and engaging the hook member 121 in the locked position or configuration. It is contemplated that in additional embodiments, such a connection block may be an integral piece of the flange, such as a portion of the front projections. The flange 124 also includes a pair of rear flange projections 130a, 130b for supporting the drive unit 118 and the pivot rod unit 116. Further, the flange 124 includes a plurality of circumferentially spaced, oblong openings or bores 132 to facilitate attachment of the hatch assembly 110 to a vehicle, such as described above.

Figure 15:
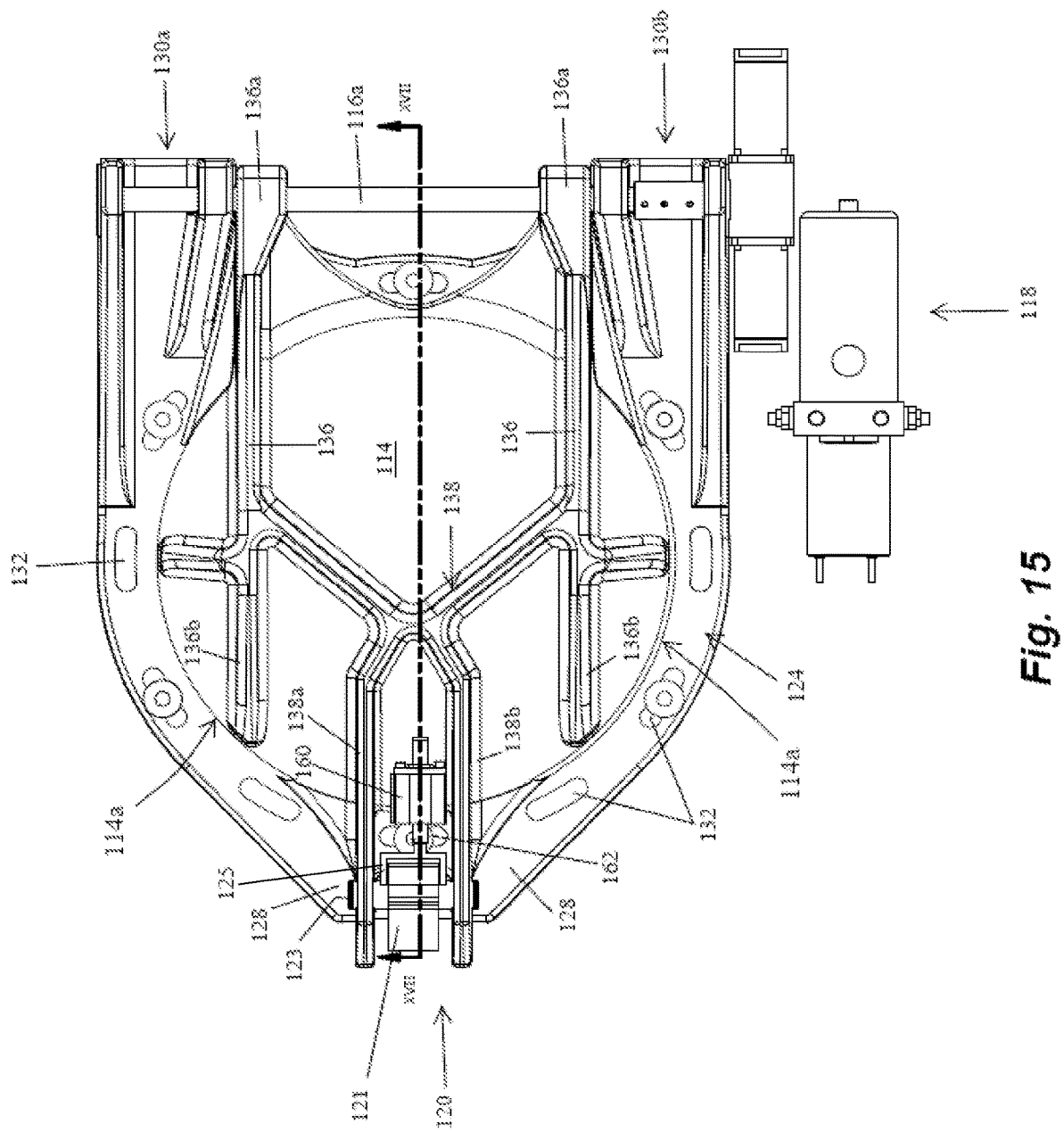
FIG. 15 is a top plan view of the automatic hatch of FIG. 14.
Figure 17:
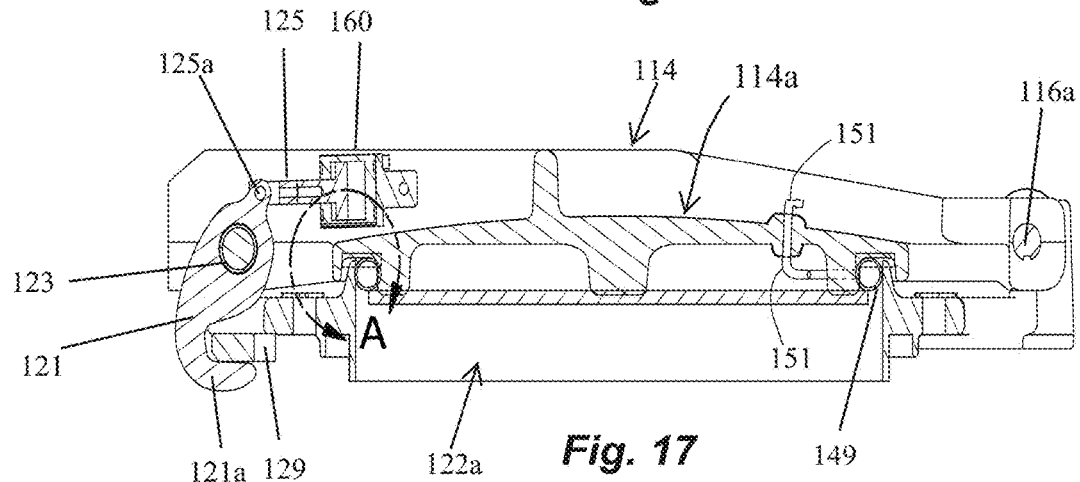
FIG. 17 is a cross-sectional side view of the automatic hatch, taken at line XVIII-XVIII shown in FIG. 15.

In the illustrated embodiment, and as best shown in FIGS. 14, 15, and 17, the cover 114 has a generally disc-shaped portion 114a covering the base opening 122a. Cover 114 is attached to (such as by welding or with fasteners or the like) or integrally formed with a pair of spaced support arms 136, where the support arms 136 are each fixedly coupled to the pivot rod unit 116 at their proximal ends 136a. Distal end portions 136b of support arms 136 project forwardly along the upper surface of the cover 114, along disc-shaped portion 114a, and terminate at an edge of the cover 114. An additional cover support 138 (FI4. 15) is provided to interconnect between the distal end portions 136b of the support arms 136, where the additional support 138 includes two projection walls 138a, 138b that extend on opposing sides of the locking assembly 120 and extend forward from the front edge of the disc-shaped portion 114a of the cover 114.

Figure 14A:
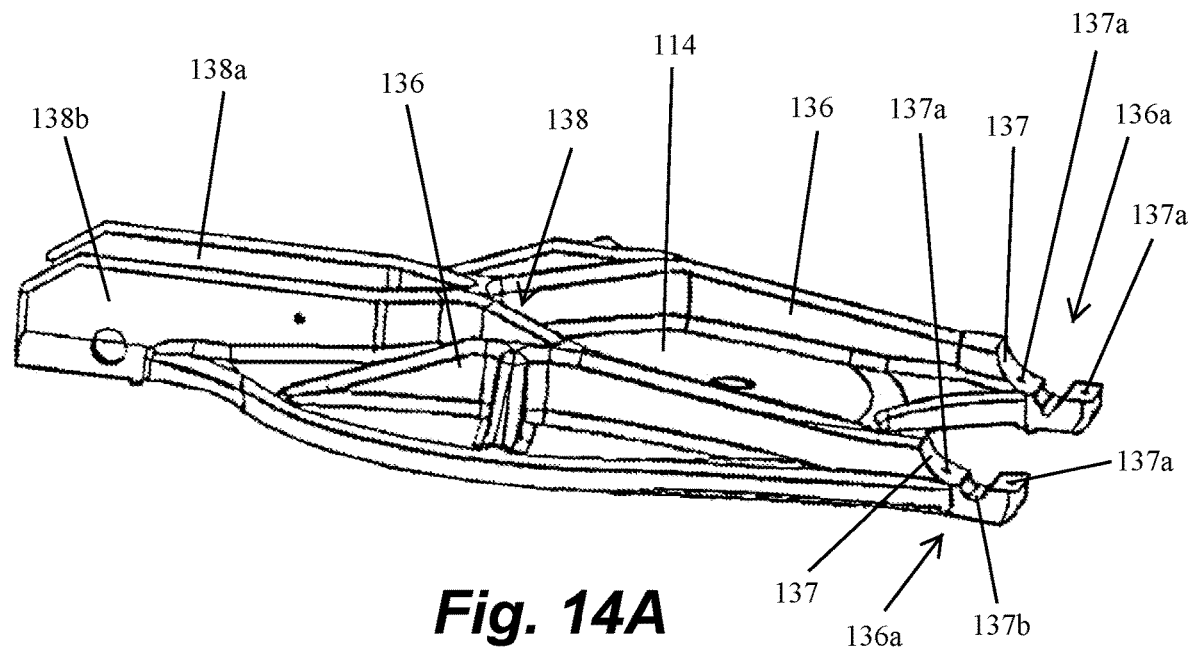
FIG. 14A is a perspective view of the cover of the automatic hatch of FIG. 14.
Figure 14B:
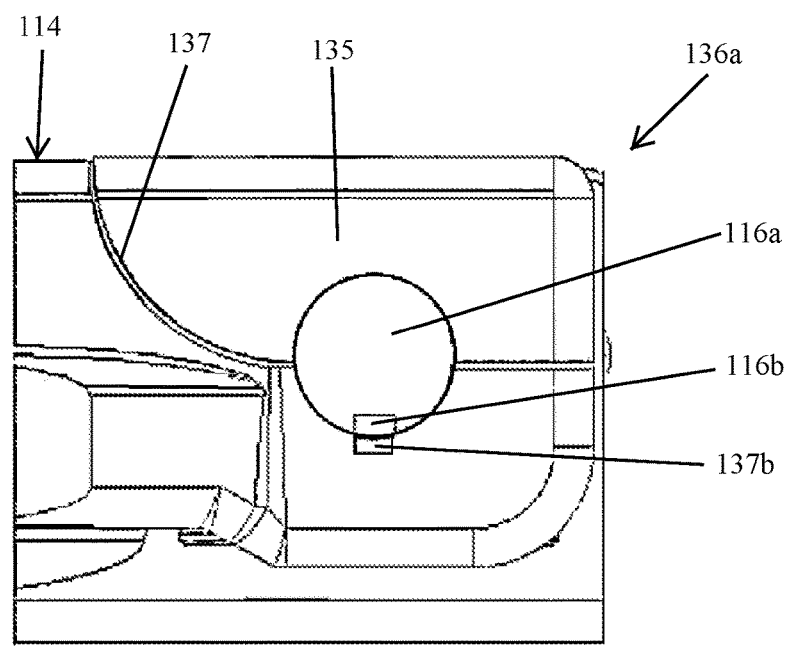
FIG. 14B is an enlarged side elevational view of an end of the cover of the automatic hatch shown in FIG. 14A.

As depicted in FIGS. 14A and 14B, the cover 114 is shown to include a cap 135 disposed over a cutaway 137 at the proximal ends 136b of the spaced part arms 136 or hubs to surround and engage the shaft 116a to the cover 114. The caps 135 (FIG. 14B) may be secured or attached in place to the arms 136, such as with threaded fasteners that engage corresponding threaded bores 137a formed in the arms' proximal ends 136b (FIG. 14A). The fasteners and caps 135 may be removed to expose a keyway 137b or slot (FIG. 14B) disposed or formed at a bottom portion of the exposed lateral aperture that engages the shaft 116a. The keyway 137b may have a generally square shaped cross-sectional shape that is cut on each of the arms 136 in generally linear alignment with each other, so as to receive an insert or filament that also engages a corresponding keyway 116b or slot in the shaft 116a, such that the shaft 116a is fixed relative to the cover 114. It is also conceivable that the cap may be integrally formed as a piece of the cover, such that the keyway may be broached through both hubs for similarly engaging the shaft.

As shown in FIGS. 15-17, a lock pivot or pivot rod 123 of the locking assembly 120 extends between the two projection walls 138a, 138b to pivotally support the hook member 121, which pivots on or about the pivot rod 123 to move between the locked position or condition (FIGS. 14-17) and an unlocked position or condition. The locking assembly 120 includes a powered lock actuator, such as a double-acting cylinder 160, which is capable of extending and retracting so as to cause the hook member 121 to pivot respectively between the locking and unlocking positons. Specifically, in the illustrated embodiment, an internal pin 162 of the double-acting cylinder 160 attaches at its front end to a U-shaped yoke 125 that pivotally couples with an upper portion of the hook member 121 by extending on opposing sides of the hook member, so that a yoke pin 125a (FIG. 17) extends though the hook member 121 to attach at the opposing sides of the U-shaped yoke 125. Optionally, the internal pin 162 of the double-acting cylinder 160 may pivotally attach directly to the hook member in additional embodiments. The double acting cylinder 160 is coupled to the cover 114 with a pivot rod that extends through an end of the cylinder 160 and secures between the projection walls 138a, 138b of the additional cover support 138. As shown, the actuator 160 is a hydraulically driven Char-Lynn® rotary motor, although it is conceivable that other types of actuators may be used, such as a Bimba® actuator, or rack and pinion style actuator.

As shown in FIG. 17, the front projections 128 of the base flange on opposing sides of the hook member 121 are arranged to provide clearance for the hook member 121 to pivot to extend the distal hook tip 121a rearward under the connection block 129 when the internal pin 162 of the double-acting cylinder 160 is displaced forward. Thus, when the internal pin 162 of the double-acting cylinder 160 is extended forward, the hook member is positioned in a locking position (FIGS. 14-17), so that the distal hook tip 121a prevents the cover 114 from being pivoted or raised toward an open configuration. Thus, it will be appreciated that vertical loads (e.g., those applied by fluid pressure acting against the underside of the cover) are primarily resisted by engagement of the distal hook tip 121a of the hook member 121 to the pivot rod 123 that attaches the hook member 121 to the cover 114, so that these loads are generally not transferred to the double-acting cylinder 160.

Figure 18:
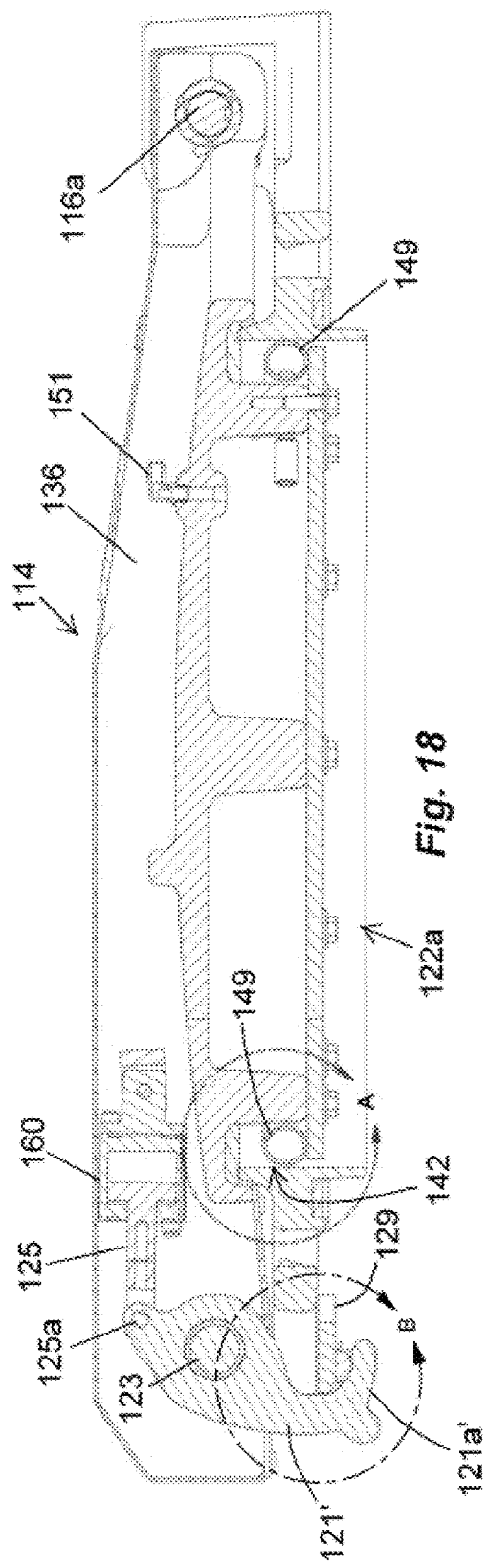
FIG. 18 is a cross-sectional side view of another automatic hatch, similar to the hatch of FIG. 14.
Figure 18B:
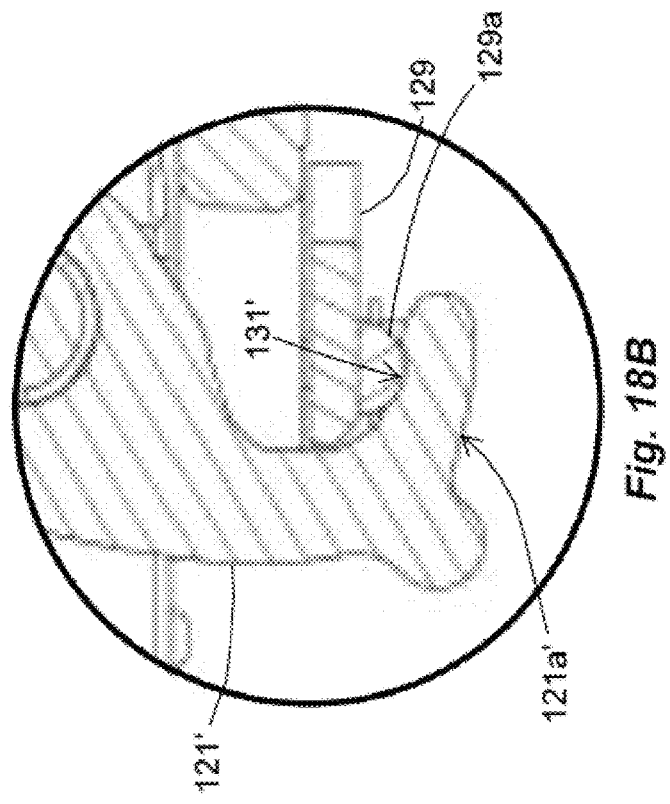
FIGS. 18A and 18B are enlarged views of the regions designated 'A' and 'B', respectively, in FIG. 18.

Optionally, and as shown in FIGS. 18 and 18B, an alternative hook member 121' provides a self-retaining cam-over (or cam-under) feature to help ensure that the hook member 121' remains in the locked position (shown) during vibration and other movements that may be expected when used on a transport trailer. The hook member's distal hook tip 121a' includes a concave-up cam surface 131' that engages a convex-down cam surface of a cam projection 129a along the underside of the connection block 129 (FIG. 18B). The cam surface 131' and cam projection 129a are shaped and positioned so that an elevated locking force must by applied by the double-acting cylinder 160 to force the distal hook top 121a' to pass under the connection block 129 to the fully locked position of FIGS. 18 and 18B. The interaction of the cam surface 131' and cam projection 129a in the locked configuration provides a detent feature that maintains the hook member 121' in the locked position even if pressure is lost, intentionally or inadvertently, in the double-acting cylinder 160. Similarly, a sufficient retraction force must be generated by the double-acting cylinder 160 to overcome the detent or retaining force provided by the cam surface 131' and cam projection 129a, for the hook member 121' to rotate to the unlocked configuration.

The double-acting cylinder 160 may be sufficiently robust to actuate its corresponding pin 162 in various environmental conditions, but need not be reinforced or strengthened to resist the significant bending moments that may be incurred if there were no such inverted hook member 121 positioned to withstand the these loads. Accordingly, the locking assembly 120 may be particularly well-suited to locking cover 114 in the closed configuration when a container that is closed by hatch assembly 110 is pressurized, because the loads applied to cover 114 by such pressurization can be resisted indefinitely by the hook member 121, without requiring the cylinder 160 to be energized. Although shown with a single hook member corresponding to the pin 162, it will be appreciated that, optionally, multiple hook members may be provided such that some load is dispersed to these additional hook members.

The double acting cylinder 160 may be include one or more pneumatic cylinders driving corresponding pistons at the inner or inboard end portion of each internal pin 162, and may be operable, for example, via the application of vacuum or pressurized air to opposite ends of the double-acting cylinder 160 to extend and retract the internal pin 162. Alternatively, double acting cylinders 160 may be hydraulically actuated, or electrically or electromagnetically actuated, or the like.

Figure 17A:
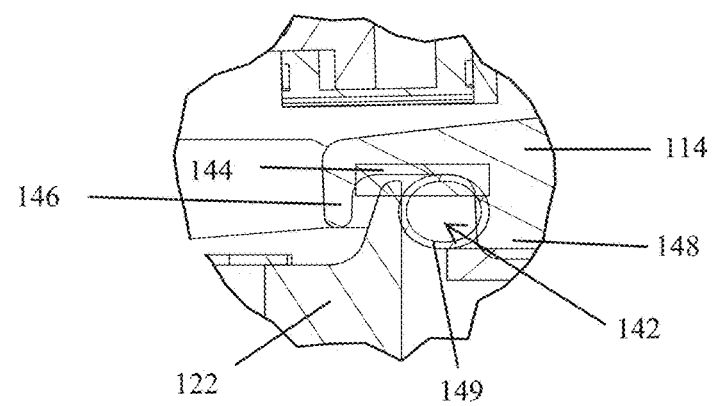
FIG. 17A is an enlarged portion of the cross-sectional view of the automatic hatch, taken at section A shown in FIG. 17.
Figure 18A:
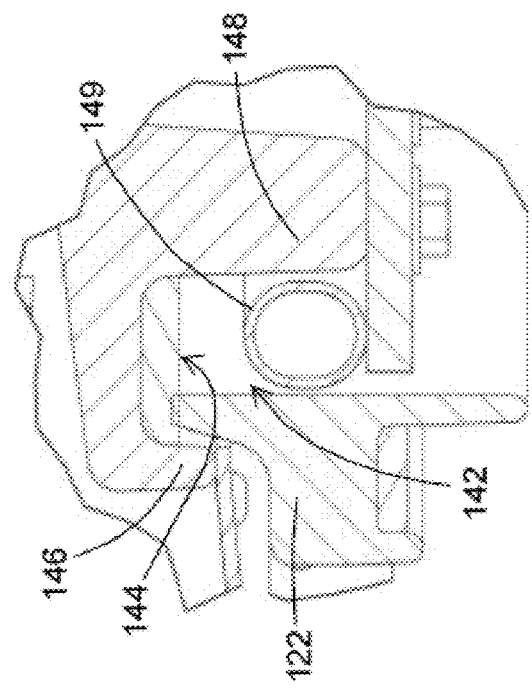

As further shown in FIGS. 17 and 17A, cover 114 has an annular channel or groove 142 in a lower surface of the cover 114, the annular channel 142 being defined between a generally planar lower surface 144 of cover 114, an annular hoop-like projection 146 extending from planar lower surface 144 and arranged generally at the outer periphery of cover 114, and a cylindrical projection 148 that extends into the base opening 122a defined by annular portion 122 of base 112 when cover 114 is closed. Annular channel 142 is adapted to receive annular lip 126 when cover 114 is closed. Optionally, an annular pneumatic seal 149 (FIGS. 17 and 17A) is disposed inside annular channel 142, such as near the intersection of planar lower surface 144 and cylindrical projection 148. The annular pneumatic seal 149 is an inflatable seal that engages annular lip 126 and provides a sealing force acting radially outwardly upon inflation to provide a fluid-tight junction between cover 114 and base 112. Seal 149 may be supplied with pressurized air via a flexible hose or conduit 151 that is routed through cover 114, such as shown in FIGS. 17 and 18A.

With respect to operating the automatic hatch assembly 110, two manually operated switches or buttons or the like may be used to send signals to a controller for operating the opening, closing, and sealing of the cover 114. Proximity switches, electronic rotary switches, or rotary actuator position switches are used to indicate when the cover 114 is in the open or closed positions and when the locking assembly 120 is in the locked or unlocked positions. To open the cover 114, two switches or buttons may be independently actuated. First, one switch or button may be depressed sending a signal to allow a bladder solenoid to deflate the annular seal 149 and start a timer, such as a five second timer. When the timer is done or the set time has elapsed, a signal is sent to the locking assembly 120 to move or retract the internal pin 162 rearward and pivot the hook member 121 forward and out of engagement with the base to the unlock position. When the pin 162 is retracted, a signal is sent to a controller indicating that the cover 114 is unlocked. A second switch or button is then depressed to send a signal to a relay switch that operates the driver unit 118 to open the cover 114. The proximity switches, electronic rotary switches, or rotary actuator position switches are used to signal that the cover 114 is in the open position. Variations on this process may include, for example, the use of a fluid pressure sensor that detects when the air pressure inside the seal 149 is sufficiently low so that the cover 114 can be opened without damage to the seal, rather than the use of a timer counting down from bladder solenoid activation to indicate when the seal 149 should be deflated.

Similarly, to close the cover 114, the second switch or button is pushed, signaling the relay switch to run the drive unit 118 to close the cover 114. The proximity switch, electronic rotary switch or rotary actuator position switch indicates when the cover 114 is in the closed position. The first switch is then pushed to send a signal to the locking assembly 120 to extend the internal pin 162 forward to pivot the hook member rearward into the locking position. A signal is then sent to the controller to indicate the cover 114 is locked. The annular seal 149 then inflates to seal the cover 114 in the locked position. The valve that controls the inflatable bladder or pump that controls the annular seal 149 may be either open or closed, such that it is conceivable that no pressure switch in necessary. Unless described otherwise, additional features of the automatic hatch assembly 110 may be substantially similar to those of the automatic hatch assembly 10, such that its components and operation may be fully understood with reference to the above description and with reference to like features numbered with like reference numbers increase by one hundred in this embodiment.

Figure 19:
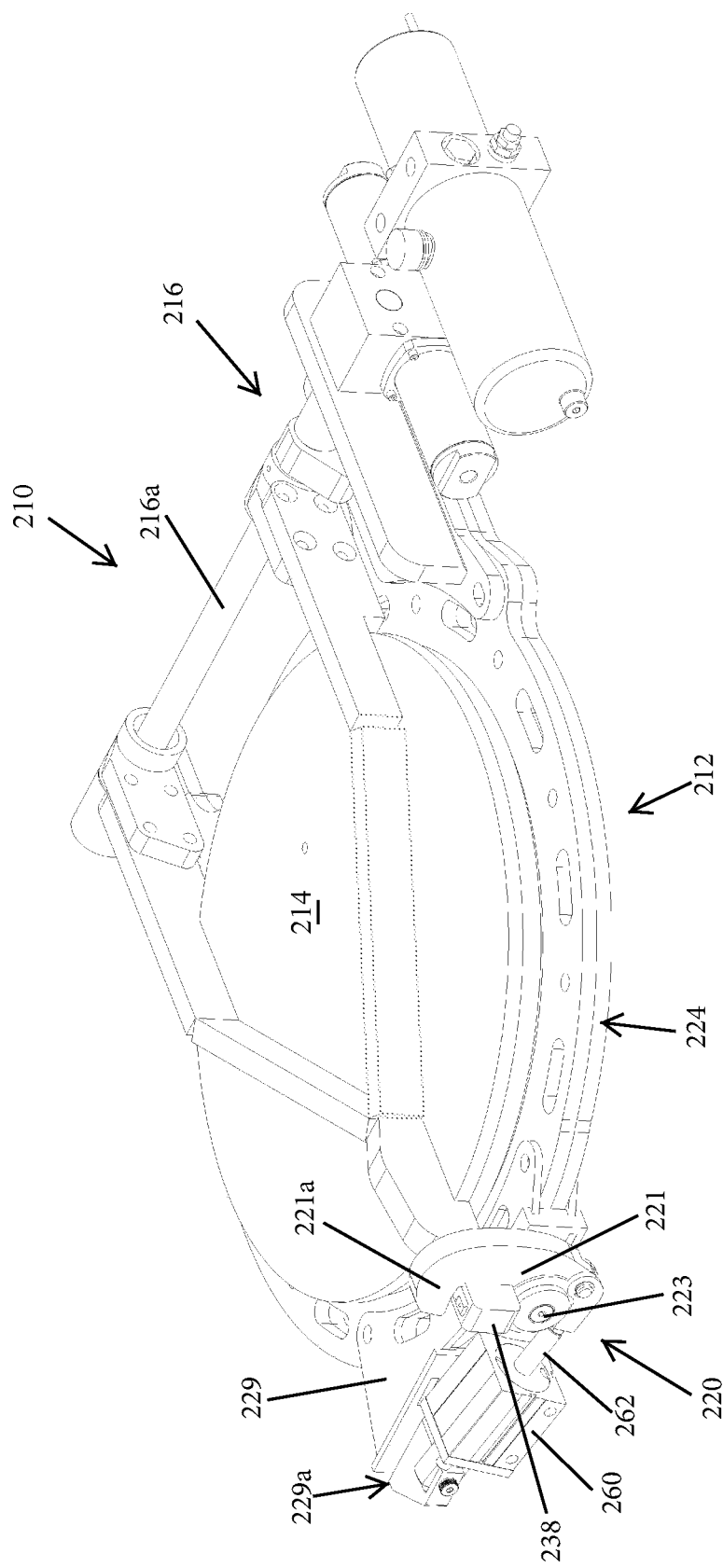
FIG. 19 is a perspective view of another automatic hatch in accordance with the present invention, having an alternative locking assembly.

Referring now to FIG. 19, another automatic hatch assembly 210 is provided with another alternative locking assembly 220 that is coupled with and supported at the base 212 of the hatch assembly 210. In this embodiment, the locking assembly 220 includes a hook member 221 that is pivotably attached at a pivot rod or fastener 223 that protrudes forward from the flange 224 of the base 212, such that the hook member may pivot about the base 212 into locked engagement with an additional support 238 that is attached at an upper surface of the cover 214 and extends forward beyond a front edge of cover 214. The locking assembly 220 is supported at the base 212 by a base bracket 229 that attaches, such as via welding or fastener, to the flange 224 of the base 212. The base bracket 229 engages the upper and lower surfaces of the flange 224 and provides a mounting structure 229a for attaching a double-acting cylinder 260.

Similar to the locking assembly 120 described above, an internal pin 262 of the double-acting cylinder 260 is pivotably coupled with a portion of the hook member 221 that is away from the pivot point provided by pivot rod 223, such that operation of the double-acting cylinder 260 causes the hook member to pivot between the locked and unlocked positions. In the locked position, as shown in FIG. 19, the distal hook tip 221a is engaged over the upper surface of the additional support 238, such that upward forces acting on the cover 214 are resisted by the hook member 221. Specifically, it will be appreciated that vertical loads (e.g., those applied by fluid pressure against the underside of the cover) are primarily resisted by engagement of the distal hook tip 221a of the hook member 221 to the pivot rod 223 that attaches the hook member 221 to the base 212, so that these loads are generally not transferred to the double-acting cylinder 260. Unless described otherwise, additional features of the automatic hatch assembly 210 may be substantially similar to those of the automatic hatch assemblies 10 and 110, such that its components and operation may be fully understood with reference to the above description and with reference to like features numbered with like reference numbers increase by one or two hundred in this embodiment.

Figure 20:
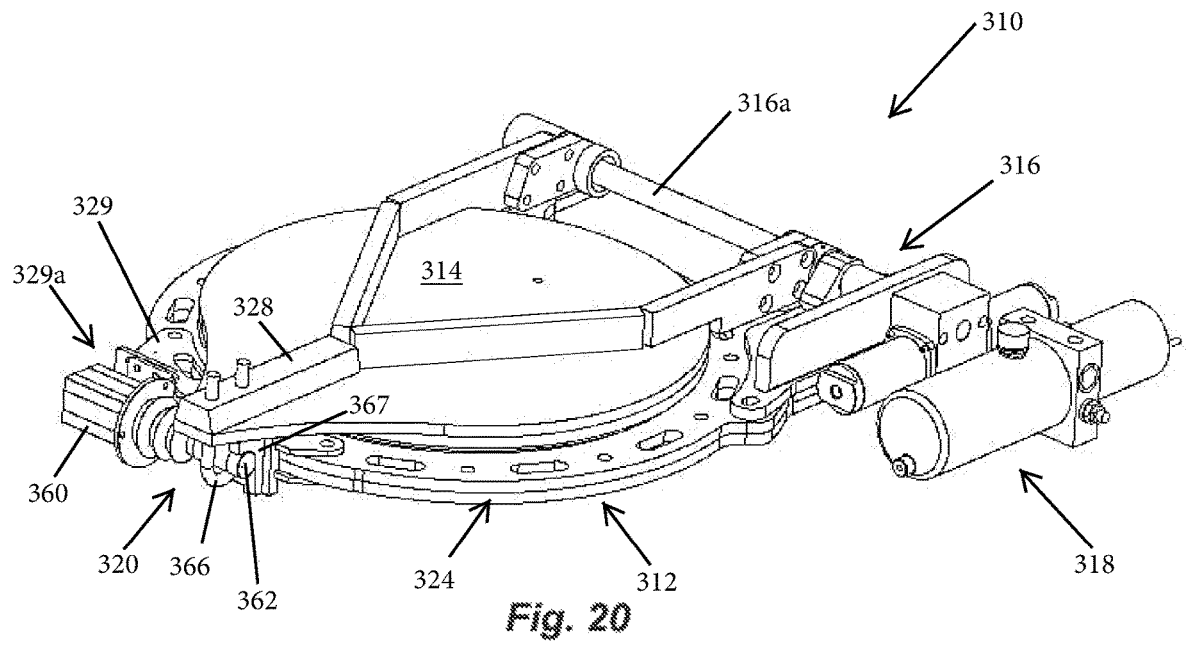
FIG. 20 is a perspective view of another automatic hatch in accordance with the present invention, having another alternative locking assembly.

Referring to FIG. 20, another automatic hatch assembly 310 includes yet another alternative locking assembly 320 that is coupled with and supported at a base 312 of the hatch assembly 310. In this embodiment, the locking assembly 320 includes a retractable pin 362 that extends to engage a U-shaped member 366 that protrudes down from an additional support 328 that is attached at an upper surface of the cover 314 and that extends forward along with a protruding front edge of cover 314. The locking assembly 320 is supported at the base 312 by a base bracket 329 that attaches, such as via welding or a fastener, to the flange 324 of the base 312. The base bracket 329 engages the upper and lower surfaces of the flange 324 and provides a mounting structure 329a for attaching a double-acting cylinder 360.

Similar to the locking assembly 20 described above, the internal pin 362 of the double-acting cylinder 360 is extendable through the U-shaped member 366 to assume a locked position, as shown. Further, the internal pin 362 of the double-acting cylinder 360 extends through the U-shaped member for the distal end of the pin 362 to engage a support member 367 that extends forward from the base bracket 329, at an opposite end from the double-acting cylinder 360. In the locked position, as shown in FIG. 20, the distal end of the pin 362 is engaged with the support member 367, such that upward forces acting on the cover 314 are transmitted, at least partially, through the pin 362 to be resisted by the support member 367. Specifically, it will be appreciated that vertical loads (e.g., those applied by fluid pressure against the underside of the cover) are primarily resisted by engagement of the distal end of the pin 362 through the U-shaped member 366 and to the support member 367, so that these loads are generally not transferred to the double-acting cylinder 360. Unless described otherwise, additional features of the automatic hatch assembly 310 may be substantially similar to those of the automatic hatch assemblies 10, 110, and 210, such that its components and operation may be fully understood with reference to the above description and with reference to like features numbered with like reference numbers increase by one or two or three hundred in this embodiment.

Figure 21:
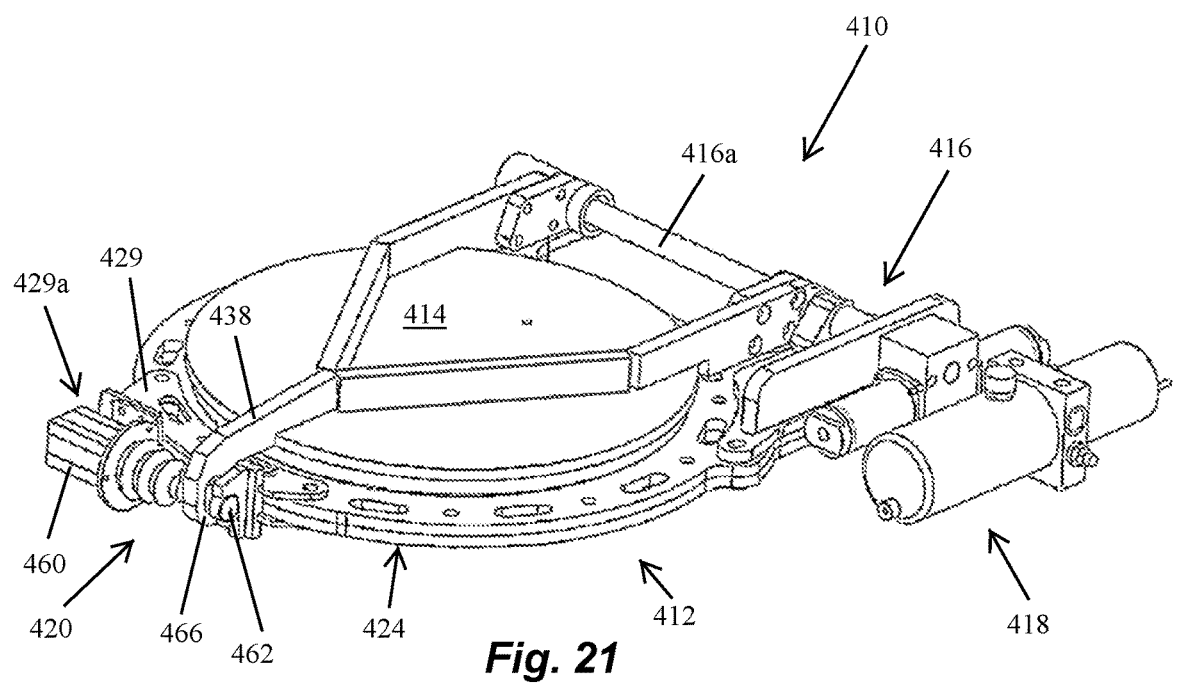
FIG. 21 is a perspective view of another automatic hatch in accordance with the present invention, having yet another alternative locking assembly.

Referring now to FIG. 21, another automatic hatch assembly 410 is provided with an alternative locking assembly 420 that is coupled with and supported at the base 412 of the hatch assembly 410. In this embodiment, the locking assembly 420 includes a retractable pin 462 that extends to engage an aperture through an extension portion 466 that integrally protrudes down from an additional support 438 that is attached at an upper surface of the cover 414 and that extends forward beyond the front edge of cover 414. The locking assembly 420 is supported at the base 412 by a base bracket 429 that attaches, such as via welding or fastener, to the flange 424 of the base 412. The base bracket 429 engages the upper and lower surfaces of the flange 424 and provides a mounting structure 429a for attaching a double-acting cylinder 460.

Similar to the locking assemblies 20 and 320, the internal pin 462 of the double-acting cylinder 460 is extendable through the aperture of the extension portion 466 in the locked position, as shown. Further, the internal pin 462 of the double-acting cylinder 460 extends through the extension portion 466, such that the distal end of the pin 462 engages a support member 467 that extends forward from the base bracket 429, at an opposite end from the double-acting cylinder 460. In the locked position, as shown in FIG. 21, the distal end of the pin 462 is engaged with the support member 467, such that upward forces acting on the cover 414 are transmitted, at least partially, through the pin 462 to be resisted by the support member 467. Specifically, it will be appreciated that vertical loads (e.g., those applied by fluid pressure against the underside of the cover) are primarily resisted by engagement of the distal end of the pin 462 through the aperture in the extension portion 466 and to the support member 467, so that these loads are generally not transferred to the double-acting cylinder 460. Unless described otherwise, additional features of the automatic hatch assembly 410 may be substantially similar to those of the automatic hatch assemblies 10, 110, and 210, 310, such that its components and operation may be fully understood with reference to the above description and with reference to like features numbered with like reference numbers increase by one or two or three or four hundred in this embodiment.

Thus, it will be appreciated that the automatic hatch of the present invention provides a convenient and secure device for opening and closing (and locking and sealing) the fill opening of a container on a vehicle, which may be particularly advantageous when the fill opening is located at an elevated or remote location. The hatch locking mechanism is particularly robust and well-suited to resisting constant opening forces applied to the cover, such as may be caused by pressurization of the container to which the automatic hatch is attached. The automatic hatch may be operated from a remote location, such as the cab of a vehicle or from a ground or floor surface nearby the hatch and associated container, and may include an automatic sequencing controller to operate the various functions of the automatic hatch in the appropriate sequences.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. An openable and closable hatch for a bulk material container, said hatch comprising:
 a base configured to be coupled to the bulk material container, said base defining a base opening generally corresponding to an opening in the bulk material container;
 a cover having:
  a first side portion and a second side portion spaced from said first side portion, said first side portion pivotably coupled to said base, and said cover positionable between an open configuration wherein said base opening is substantially uncovered, and a closed configuration wherein said base opening is substantially covered by said cover;
  a disc-shaped portion covering said base opening when said cover is positioned in said closed configuration, said disc-shaped portion extending from said first side portion to said second side portion; and
  a pair of spaced-apart projection walls extending upwardly from said disc-shaped portion when said cover is in said closed configuration, wherein said spaced-apart projection walls extend laterally outboard of said disc-shaped portion at said second side portion, and wherein said spaced-apart projection walls are disposed along said second side portion;
 a projection extending radially outwardly from said base and positioned below said second side portion of said cover in said closed configuration; and
 a locking device coupled directly to said second side portion of said cover, said locking device comprising:
  a powered lock actuator positioned atop said second side portion of said cover said powered lock actuator comprising a double-acting cylinder and an extendable shaft supported in said double-acting cylinder;
  a lock pivot positioned above said projection when said cover is positioned in said closed configuration, said lock pivot extending between and supported by said projection walls at a location that is laterally outboard of said disc-shaped portion; and
  a latch pivotably coupled to said lock pivot and adapted to selectively move between a deployed position and a retracted position in response to said powered lock actuator, said latch comprising an upper portion directly coupled to said extendable shaft and a hook tip at a distal end portion of said latch opposite said upper portion, with said lock pivot disposed between said upper portion and said hook tip, wherein said hook tip comprises a cam surface and is configured to engage a downwardly-facing surface of said projection in response to extension of said extendable shaft;

wherein said powered lock actuator and at least a portion of said latch are mounted between said projection walls;

wherein, when said latch is moved to said deployed position, said cam surface of said hook tip of said latch extends below and engages said downwardly-facing surface of said projection to lock said cover in said closed configuration; and wherein said lock pivot is configured to bear a load when (i) an internal fluid pressure inside the bulk material container acting on said cover is greater than an external fluid pressure outside the bulk material container acting on said cover; (ii) said cover is positioned in said closed configuration; and (iii) said latch is positioned in said deployed position.

2. The openable and closeable hatch of claim 1, wherein said double-acting cylinder comprises a fluid cylinder, and said extendable shaft includes a piston.

3. The openable and closeable hatch of claim 1, further comprising:
an annular lip at an upper portion of said base, said annular lip defining an upper portion of said base opening;
a downwardly-facing annular channel disposed in a lower surface of said cover, said annular channel configured to receive said annular lip of said base when said cover is positioned in said closed configuration; and
an annular seal disposed inside of said annular channel and configured to engage said annular lip on a radial outer side of said annular seal.

4. The openable and closeable hatch of claim 3, said annular lip comprising a radially-inwardly facing surface, wherein said annular seal is configured to engage said radially-inwardly facing surface and exert a force directed radially outwardly against said radially-inwardly facing surface.

5. The openable and closeable hatch of claim 3, wherein said seal comprises a pneumatic inflatable seal.

6. The openable and closeable hatch of claim 5, wherein an air conduit passes through said disc-shaped portion and is in fluid communication with said pneumatic inflatable seal.

7. The openable and closeable hatch of claim 5, further comprising:
a pivot rod coupled to said cover and to said base, said pivot rod having a longitudinal axis and being pivotable about the longitudinal axis and relative to said base; and
a pivot motor operable to rotate said pivot rod and said cover together about the longitudinal axis of said pivot rod.

8. The openable and closeable hatch of claim 7, further comprising a seal actuator operable to cause said pneumatic inflatable seal to inflate and deflate.

9. The openable and closeable hatch of claim 8, further comprising a sequencing controller in electronic communication with each of said powered lock actuator, said pivot motor, and said seal actuator, wherein when said cover is positioned in said closed configuration, said sequencing controller is operable to (i) activate said seal actuator to deflate said pneumatic inflatable seal and activate said powered lock actuator to move said latch from said deployed position to said retracted position in response to a first user input at said controller, and (ii) activate said pivot motor to move said cover to said open configuration in response to a second user input at said controller.

10. The openable and closeable hatch of claim 9, wherein when said cover is positioned in said open configuration, said sequencing controller is operable to (iii) activate said pivot motor to move said cover to said closed configuration in response to a third user input at said controller, and in response to a fourth user input at said controller, (iv) activate said powered lock actuator to move said latch from said retracted position to said deployed position, and activate said seal actuator to inflate said pneumatic inflatable seal.

11. An openable and closable hatch for a bulk material container, said hatch comprising:
a base configured to be coupled to the bulk material container, said base defining a base opening generally corresponding to an opening in the bulk material container;
a cover having:
a first side portion and a second side portion spaced from said first side portion, said first side portion pivotably coupled to said base, and said cover positionable between an open configuration wherein said base opening is substantially uncovered, and a closed configuration wherein said base opening is substantially covered by said cover;
a disc-shaped portion covering said base opening when said cover is positioned in said closed configuration, said disc-shaped portion extending from said first side portion to said second side portion; and
a pair of spaced-apart projection walls extending upwardly from said disc-shaped portion when said cover is in said closed configuration, wherein said spaced-apart projection walls extend laterally outboard of said disc-shaped portion at said second side portion, and wherein said spaced-apart projection walls are disposed along said second side portion;
a projection extending radially outwardly from said base and positioned below said second side portion of said cover in said closed configuration; and
a locking device coupled directly to said second side portion of said cover, said locking device comprising:
a powered lock actuator positioned atop said second side portion of said cover;
a lock pivot positioned above said projection when said cover is positioned in said closed configuration, said lock pivot extending between and supported by said projection walls at a location that is laterally outboard of said disc-shaped portion; and
a latch pivotably coupled to said lock pivot and adapted to selectively move between a deployed position and a retracted position in response to said powered lock actuator;
wherein said powered lock actuator and at least a portion of said latch are mounted between said projection walls;
wherein, when said cover is in said closed configuration and said latch is moved to said deployed position, a hook tip at a distal end portion of said latch extends below and engages said projection to lock said cover in said closed configuration;
wherein said latch is positioned laterally outboard of said disc-shaped portion;
wherein when said latch is positioned in said deployed position, said projection walls extend laterally outboard of said disc-shaped portion further than said latch extends outboard of said disc-shaped portion, and said distal end portion of said latch extends below said projection walls; and wherein said lock pivot is configured to bear a load when (i) an internal fluid pressure inside the bulk material container acting on said cover is greater than an external fluid pressure outside the bulk material container acting on said cover; (ii) said cover is positioned in said closed configuration; and (iii) said latch is positioned in said deployed position.

12. The openable and closeable hatch of claim 11, wherein said powered lock actuator comprises a double-acting cylinder and an extendable shaft supported in said double-acting cylinder, an upper portion of said latch is directly coupled to said extendable shaft and said hook tip at said distal end portion is opposite said upper portion, with said lock pivot disposed between said upper portion and said distal end portion, wherein said hook tip is configured to engage a downwardly-facing surface of said projection in response to extension of said extendable shaft.

13. A vehicle comprising said bulk material container and said openable and closeable hatch of claim 10, wherein said bulk material container is selectively attachable to and detachable from said vehicle, and said sequencing controller is mountable in a cab of said vehicle.

14. An openable and closable hatch for a bulk material container, said hatch comprising:
- a base configured to be coupled to the bulk material container, said base defining a base opening generally corresponding to an opening in the bulk material container;
- an annular lip at an upper portion of said base, said annular lip defining an upper portion of said base opening;
- a cover having:
  - a first side portion and a second side portion spaced from said first side portion, said first side portion pivotably coupled to said base, and said cover positionable between an open configuration wherein said base opening is substantially uncovered, and a closed configuration wherein said base opening is substantially covered by said cover;
  - a disc-shaped portion covering said base opening when said cover is positioned in said closed configuration, said disc-shaped portion extending from said first side portion to said second side portion; and
  - a pair of spaced-apart projection walls extending upwardly from said disc-shaped portion when said cover is in said closed configuration,
  wherein said spaced-apart projection walls extend laterally outboard of said disc-shaped portion at said second side portion, and wherein said spaced-apart projection walls are disposed along said second side portion;
- a downwardly-facing annular channel disposed in a lower surface of said cover, said annular channel configured to receive said annular lip of said base when said cover is positioned in said closed configuration;
- an annular pneumatic seal positioned in said annular channel and configured to engage said annular lip on a radial outer side of said annular seal;
- a projection extending radially outwardly from said base and positioned below said second side portion of said cover in said closed configuration;
- a locking device coupled directly to said second side portion of said cover such that said locking device and said cover are fixed together, said locking device comprising:
  - a powered lock actuator positioned atop said second side portion of said cover;
  - a lock pivot coupled to said projection walls and positioned above said projection when said cover is positioned in said closed configuration, said lock pivot extending between and supported by said projection walls at a location that is laterally outboard of said disc-shaped portion; and
  - a latch pivotably coupled to said lock pivot and adapted to selectively move between a deployed position and a retracted position in response to said powered lock actuator;
- a pivot rod coupled to said cover and to said base, said pivot rod having a longitudinal axis and being pivotable about the longitudinal axis; and
- a pivot motor operable to rotate said pivot rod and said cover together about the longitudinal axis of said pivot rod;

wherein said powered lock actuator and at least a portion of said latch are mounted between said projection walls;

wherein, when said cover is in said closed configuration and said latch is moved to said deployed position, a distal end portion of said latch extends below and engages said projection to lock said cover in said closed configuration and said projection walls extend laterally outboard of said disc-shaped portion further than said latch extends outboard of said disc-shaped portion; and wherein said lock pivot is configured to bear a load when: (i) an internal fluid pressure inside the bulk material container acting on said cover is greater than an external fluid pressure outside the bulk material container acting on said cover; (ii) said cover is positioned in said closed configuration; and (iii) said latch is positioned in said deployed position.

15. The openable and closeable hatch of claim 14, further comprising a seal actuator operable to cause said pneumatic seal to inflate and deflate.

16. The openable and closeable hatch of claim 15, wherein an air conduit passes through said disc-shaped portion and is in fluid communication with said pneumatic seal.

17. The openable and closeable hatch of claim 16, further comprising a sequencing controller in electronic communication with each of said powered lock actuator, said pivot motor, and said seal actuator, wherein when said cover is positioned in said closed configuration, said sequencing controller is operable to (i) activate said seal actuator to deflate said pneumatic seal and activate said powered lock actuator to move said latch from said deployed position to said retracted position in response to a first user input at said controller, and (ii) activate said pivot motor to move said cover to said open configuration in response to a second user input at said controller, and wherein when said cover is positioned in said open configuration, said sequencing controller is operable to (iii) activate said pivot motor to move said cover to said closed configuration in response to a third user input at said controller, and in response to a fourth user input at said controller, (iv) activate said powered lock actuator to move said latch from said retracted position to said deployed position, and activate said seal actuator to inflate said pneumatic seal.

* * * * *